(12) United States Patent
Asai

(10) Patent No.: US 10,030,637 B2
(45) Date of Patent: Jul. 24, 2018

(54) ACTUATOR

(71) Applicant: Panasonic Intellectual Property Management Co., Ltd., Osaka (JP)

(72) Inventor: Katsuhiko Asai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 153 days.

(21) Appl. No.: 15/298,293

(22) Filed: Oct. 20, 2016

(65) Prior Publication Data
US 2017/0175718 A1  Jun. 22, 2017

(30) Foreign Application Priority Data

Dec. 18, 2015 (JP) ................................. 2015-248036

(51) Int. Cl.
*F03G 7/06* (2006.01)

(52) U.S. Cl.
CPC ..................................... *F03G 7/06* (2013.01)

(58) Field of Classification Search
CPC .. F03G 7/06; F03G 7/065; F04B 35/01; F04B 35/04; F04B 35/045; H01L 41/082; H01L 41/1132
USPC ................. 310/307, 365, 367; 442/208–210, 442/228–230; 60/527–529
See application file for complete search history.

(56) References Cited

U.S. PATENT DOCUMENTS

| 8,357,881 | B2* | 1/2013 | Feng | ....................... | H05B 3/342 |
| | | | | | 219/529 |
| 8,501,317 | B2* | 8/2013 | Miura | .................... | D01D 11/06 |
| | | | | | 428/364 |
| 8,922,100 | B2* | 12/2014 | Whinnery | ............ | D03D 1/0088 |
| | | | | | 310/365 |

(Continued)

FOREIGN PATENT DOCUMENTS

| JP | 2001-227455 | 8/2001 |
| JP | 2015-532959 | 11/2015 |
| WO | 2014/022667 | 2/2014 |

OTHER PUBLICATIONS

Carter S. Haines et al., "Artificial Muscles from Fishing Line and Sewing Thread", Science, vol. 343, pp. 868-872, Feb. 21, 2014.

*Primary Examiner* — Mark Laurenzi
*Assistant Examiner* — Shafiq Mian
(74) *Attorney, Agent, or Firm* — Wenderoth, Lind & Ponack, L.L.P.

(57) ABSTRACT

An actuator includes a first actuator unit including first actuator fibers and a second actuator unit including second actuator fibers located between plate members. The first and second actuator fibers stretch or contract when temperature changes. A spring rate of the second actuator fibers is higher than that of the first actuator fibers. A maximum displacement amount of the second actuator unit is smaller than that of the first actuator unit. The temperature of the first actuator fibers is controlled in a case where a displacement amount of one plate member relative to the other plate member is smaller than a first displacement amount, and the temperature of the first actuator fibers and the temperature of the second actuator fibers are controlled in a case where the displacement amount is equal to or larger than the first displacement amount and equal to or smaller than a maximum displacement amount.

15 Claims, 19 Drawing Sheets

(56) References Cited

U.S. PATENT DOCUMENTS

| | | | | |
|---|---|---|---|---|
| 9,903,350 B2* | 2/2018 | Li | ................................ | F03G 7/06 |
| 2004/0107829 A1* | 6/2004 | Davis | .................... | F15B 15/103 |
| | | | | 92/90 |
| 2009/0029620 A1* | 1/2009 | Miura | ................... | A41D 27/28 |
| | | | | 442/362 |
| 2010/0203316 A1* | 8/2010 | Hata | ....................... | B29C 70/14 |
| | | | | 428/299.1 |
| 2010/0308489 A1* | 12/2010 | Feng | ...................... | B82Y 30/00 |
| | | | | 264/105 |
| 2012/0045643 A1* | 2/2012 | Liu | ......................... | B82B 1/002 |
| | | | | 428/368 |
| 2012/0315459 A1* | 12/2012 | Fugetsu | ................ | B82Y 30/00 |
| | | | | 428/299.1 |
| 2014/0132119 A1* | 5/2014 | Whinnery | ............ | D03D 1/0064 |
| | | | | 310/366 |
| 2014/0315120 A1* | 10/2014 | Imanishi | ................. | H01M 4/96 |
| | | | | 429/523 |
| 2015/0139819 A1 | 5/2015 | Bagagli et al. | | |

* cited by examiner

|  | (a) | (b) | (c) |
|---|---|---|---|
| LOAD | 0 | 0.16F | F |
| DISPLACEMENT AMOUNT | 0 | 4D | 5D |
| TEMPERATURE CHANGE 2a,2b | - | 0.2ΔT | 0.2ΔT |
| TEMPERATURE CHANGE 3a – 3h | - | - | ΔT |
| INPUT ENERGY | - | 0.2J | J |
| DRIVING EFFICIENCY | - | 0.8η (5 TIMES) | η |

FIG. 8

| | (a) | (b) | (c) | (d) | (e) | (f) |
|---|---|---|---|---|---|---|
| LOAD | 0 | 0.04F | 0.13F | 0.287F | 0.543F | F |
| DISPLACEMENT AMOUNT | 0 | D | 2D | 3D | 4D | 5D |
| TEMPERATURE CHANGE 2c,2d | - | 0.2ΔT | 0.2ΔT | 0.2ΔT | 0.2ΔT | 0.2ΔT |
| TEMPERATURE CHANGE 3l,3m | - | - | 0.25ΔT | 0.25ΔT | 0.25ΔT | 0.25ΔT |
| TEMPERATURE CHANGE 3k,3n | - | - | - | 0.333ΔT | 0.333ΔT | 0.333ΔT |
| TEMPERATURE CHANGE 3j,3o | - | - | - | - | 0.5ΔT | 0.5ΔT |
| TEMPERATURE CHANGE 3i,3p | - | - | - | - | - | ΔT |
| INPUT ENERGY | - | 0.2J | 0.4J | 0.6J | 0.8J | J |
| DRIVING EFFICIENCY | - | 0.2η (5 TIMES) | 0.325η (2.5 TIMES) | 0.478η (1.67 TIMES) | 0.679η (1.25 TIMES) | η |

FIG. 13

| | | (a) | (b) | (c) | (d) | (e) |
|---|---|---|---|---|---|---|
| LOAD | | 0 | 0.125F | 0.313F | 0.531F | F |
| DISPLACEMENT AMOUNT | 2e,2f | 0 | 4D | 6D | 7D | 8D |
| TEMPERATURE CHANGE | 3s,3t | - | 0.125ΔT | 0.125ΔT | 0.125ΔT | 0.125ΔT |
| | 3r,3u | - | - | 0.25ΔT | 0.25ΔT | 0.25ΔT |
| | 3g,3v | - | - | - | 0.5ΔT | 0.5ΔT |
| INPUT ENERGY | | - | 0.25J | 0.5J | 0.75J | ΔT |
| | | | | | | J |
| DRIVING EFFICIENCY | | - | 0.5η (4 TIMES) | 0.625η (2 TIMES) | 0.708η (1.33 TIMES) | η |

FIG. 20

| | (a) | (b) | (c) | (d) | (e) | (f) |
|---|---|---|---|---|---|---|
| LOAD | 0 | 0.2F | 0.4F | 0.6F | 0.8F | F |
| DISPLACEMENT AMOUNT | 0 | 0.2D | 0.4D | 0.6D | 0.8D | D |
| TEMPERATURE CHANGE | - | ΔT | ΔT | ΔT | ΔT | ΔT |
| INPUT ENERGY | - | J | J | J | J | J |
| DRIVING EFFICIENCY | - | 0.2η | 0.4η | 0.6η | 0.8η | η |

FIG. 23

|  | (a) | (b) | (c) | (d) | (e) | (f) |
|---|---|---|---|---|---|---|
| LOAD | 0 | 0.2F | 0.4F | 0.6F | 0.8F | F |
| DISPLACEMENT AMOUNT | 0 | D | 2D | 3D | 4D | 5D |
| TEMPERATURE CHANGE | - | $0.2\Delta T$ | $0.2\Delta T$ | $0.2\Delta T$ | $0.2\Delta T$ | $0.2\Delta T$ |
| INPUT ENERGY | - | J | J | J | J | J |
| DRIVING EFFICIENCY | - | $0.2\eta$ | $0.4\eta$ | $0.6\eta$ | $0.8\eta$ | $\eta$ |

ACTUATOR

BACKGROUND

1. Technical Field

The present disclosure relates to an actuator that stretches and contracts in accordance with a change in temperature.

2. Description of the Related Art

In accordance with increasing demands for a machine (e.g., household robot) that works close to a human, there are increasing expectations for an artificial muscle actuator having features such as a light weight and flexibility like human muscles. There are various kinds of artificial muscle actuators. Most of the artificial muscle actuators utilize deformation of a high polymer material that is suitable for the features such as a light-weight and flexibility.

An actuator having a structure in which a twisted high polymer fiber bundle is wound in a coil is known as one of the actuators that utilize deformation of a high polymer material (see, for example, International Publication No. WO 2014/022667 and Carter S. Haines et al. "Artificial Muscles from Fishing Line and Sewing Thread", SCIENCE, VOL. 343, pp. 868-872, 21 Feb. 2014). This actuator is a fibrous actuator that stretches and contracts in accordance with a change in temperature of the high polymer fiber bundle that is a plurality of twisted high polymer fibers. As the temperature of the high polymer fiber bundle rises, the twisted high polymer fibers are untwisted, and as a result, the entire length of the coil-like fibers contracts or stretches. As the temperature of the high polymer fiber bundle drops, the high polymer fibers are twisted again, and as a result, the entire length of the coil-like fibers stretches or contracts conversely. Whether the entire length of the coil-like fibers contracts or stretches when the temperature rises is determined on the basis of whether or not a direction of twisting of the high polymer fiber bundle is the same as a direction of winding of the coil. In a case where the direction of twisting of the high polymer fiber bundle is the same as the direction of winding of the coil, the entire length of the actuator contracts in accordance with a rise in temperature and stretches in accordance with a drop in temperature.

However, considering a case where a conventional actuator is actually used, a maximum value of load that is assumed to be applied to the actuator need be set so as not to exceed allowable maximum load so that the actuator is not broken. In consideration of safety, normal load of the actuator is set far smaller than the allowable maximum load. This undesirably makes driving efficiency under normal load low.

SUMMARY

One non-limiting and exemplary embodiment provides an actuator that has improved driving efficiency.

In one general aspect, the techniques disclosed here feature an actuator including: a first actuator unit including one or more first actuator fibers; a second actuator unit including one or more second actuator fibers; a base; and a displacement member, wherein each of the one or more first actuator fibers and the one or more second actuator fibers has a structure in which a high polymer fiber bundle is wound spirally, wherein the high polymer fiber bundle includes one or more twisted high polymer fibers, wherein each of the one or more first actuator fibers and the one or more second actuator fibers stretches or contracts when temperature of the high polymer fiber bundle that each of the one or more first actuator fibers and the one or more second actuator fibers includes is changed, wherein the first actuator unit stretches or contracts by using the one or more first actuator fibers, and the second actuator unit stretches or contracts by using the one or more second actuator fibers, wherein a spring rate of each of the one or more second actuator fibers is higher than a spring rate of each of the one or more first actuator fibers, wherein a maximum displacement amount of the second actuator unit is smaller than a maximum displacement amount of the first actuator unit, wherein the first actuator unit and the second actuator unit are located between the base and the displacement member, wherein temperature of the one or more first actuator fibers is controlled and temperature of the one or more second actuator fibers is not controlled in a case where a displacement amount of the displacement member relative to the base is smaller than a first displacement amount, and wherein the temperature of the one or more first actuator fibers is controlled and the temperature of the one or more second actuator fibers are controlled in a case where the displacement amount of the displacement member relative to the base is equal to or larger than the first displacement amount and equal to or smaller than a maximum displacement amount of the displacement member relative to the base.

According to the present disclosure, an actuator can have improved driving efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a table illustrating driving efficiency of the actuator according to Embodiment 2;

FIG. 13 is a table illustrating driving efficiency of the actuator according to Embodiment 3;

FIG. 20 is a table illustrating driving efficiency of the actuator according to Comparative Example 1;

FIG. 23 is a table illustrating driving efficiency of the actuator according to Comparative Example 2.

DETAILED DESCRIPTION

Figure 1:
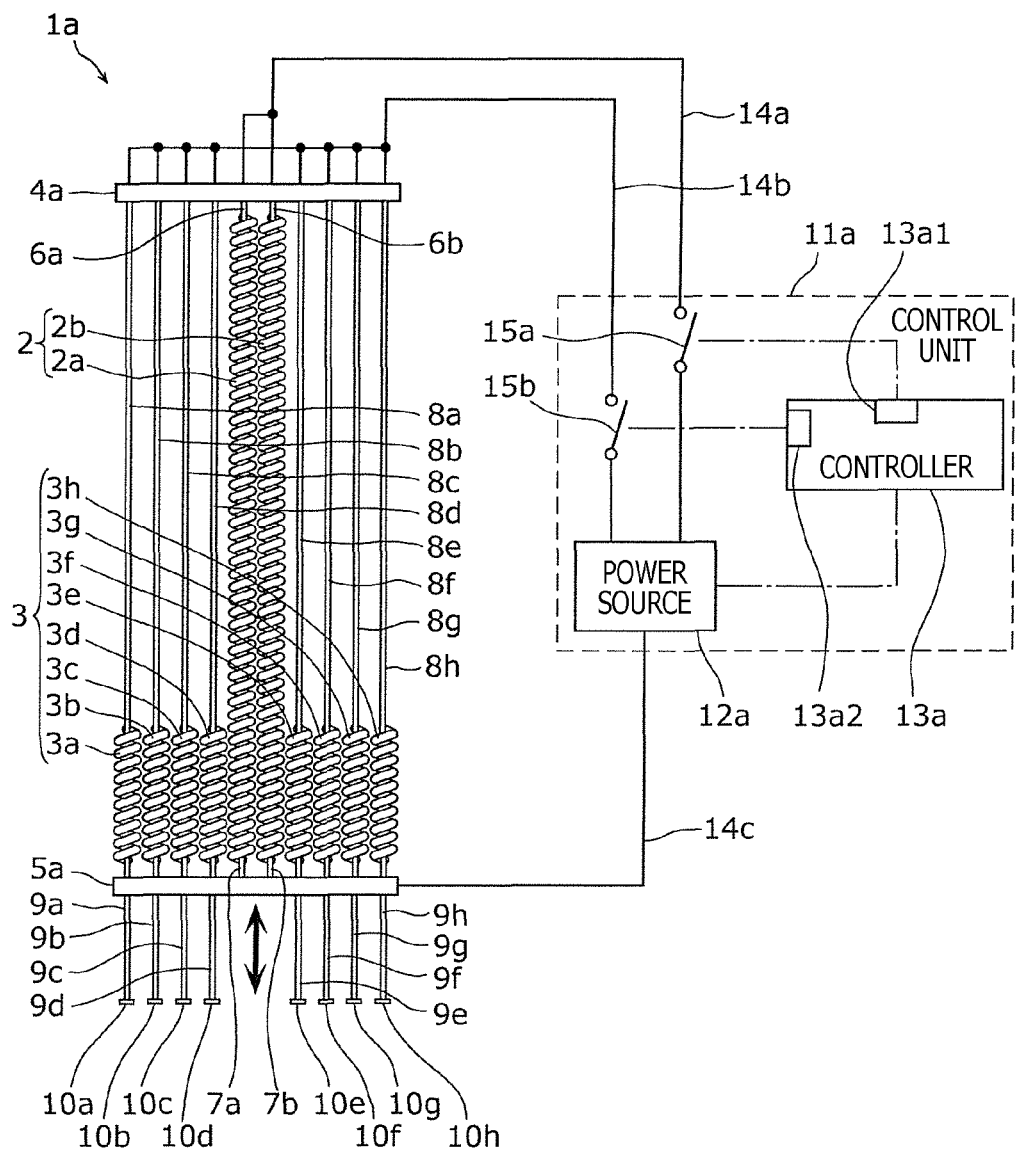
FIG. 1 is a diagram illustrating an outline of an actuator according to Embodiment 1.

Underlying Knowledge Forming Basis of the Present Disclosure

The inventor of the present invention found the following problems concerning the actuator described in BACKGROUND.

In the actuator described in BACKGROUND having a structure in which a twisted high polymer fiber bundle is wound in a coil, deformation that occurs in accordance with a change in temperature is almost constant irrespective of load. This is considered to be because a position of balance is changed by an amount corresponding to force generated in accordance with a change in temperature from a position where load and elasticity of a coil spring are balanced out. In the actuator having such characteristics, thermal energy W needed to generate displacement ΔL is not affected by load P, and therefore driving efficiency η=PΔL/W, which is a rate of work to the thermal energy, becomes higher as the load increases. That is, the driving efficiency is maximum under allowable maximum load and becomes lower as the load decreases.

Since normal load of the actuator is far smaller than the allowable maximum load in consideration of safety as described above, a problem that driving efficiency becomes low under normal load arises.

In order to solve such problems, an actuator according to one aspect of the present disclosure includes: a first actuator unit including one or more first actuator fibers; a second actuator unit including one or more second actuator fibers; a base; and a displacement member, wherein each of the one or more first actuator fibers and the one or more second actuator fibers has a structure in which a high polymer fiber bundle is wound spirally, wherein the high polymer fiber bundle includes one or more twisted high polymer fibers, wherein each of the one or more first actuator fibers and the one or more second actuator fibers stretches or contracts when temperature of the high polymer fiber bundle that each of the one or more first actuator fibers and the one or more second actuator fibers includes is changed, wherein the first actuator unit stretches or contracts by using the one or more first actuator fibers, and the second actuator unit stretches or contracts by using the one or more second actuator fibers, wherein a spring rate of each of the one or more second actuator fibers is higher than a spring rate of each of the one or more first actuator fibers, wherein a maximum displacement amount of the second actuator unit is smaller than a maximum displacement amount of the first actuator unit, wherein the first actuator unit and the second actuator unit are located between the base and the displacement member, wherein temperature of the one or more first actuator fibers is controlled and temperature of the one or more second actuator fibers is not controlled in a case where a displacement amount of the displacement member relative to the base is smaller than a first displacement amount, and wherein the temperature of the one or more first actuator fibers is controlled and the temperature of the one or more second actuator fibers are controlled in a case where the displacement amount of the displacement member relative to the base is equal to or larger than the first displacement amount and equal to or smaller than a maximum displacement amount of the displacement member relative to the base.

According to the arrangement, the actuator can have a state in which the displacement member is moved by using the first actuator unit or a state in which the displacement member is moved by using the first actuator unit and the second actuator unit. For example, in a case where load that acts on the displacement member is small, the displacement member can be moved by using the first actuator unit without using the second actuator unit. In this case, thermal energy can be made smaller by an amount needed to change the temperature of the second actuator unit than that needed in a case where tension acts on both of the one or more first actuator fibers that constitute the first actuator unit and the one or more second actuator fibers that constitute the second actuator unit. This makes it possible to increase driving efficiency under low load. It is therefore possible to improve driving efficiency of the actuator.

The actuator may be, for example, arranged such that the displacement member includes a plurality of electrode units; the plurality of electrode units correspond to the one or more first actuator fibers and the one or more second actuator fibers; in a case where the displacement amount is smaller than the first displacement amount, the temperature of the one or more first actuator fibers is controlled by electricity application using a corresponding one of the plurality of electrode units, and no electricity is applied to the one or more second actuator fibers; and in a case where the displacement amount is equal to or larger than the first displacement amount and is equal to or smaller than the maximum displacement amount, the temperature of the one or more first actuator fibers and the temperature of the one or more second actuator fibers are controlled by electricity application using the corresponding plurality of electrode units.

According to the arrangement, electrical connection between the one or more second actuator fibers and the displacement member can be switched by using the plurality of electrode units. In a case where the displacement amount is smaller than the first displacement amount, the first actuator fibers are controlled by electricity application using the electrode unit corresponding to the one or more first actuator fibers. It is therefore possible to increase the driving efficiency of the actuator.

The actuator may be, for example, arranged to further include a control unit including a first controller that controls electricity application to the one or more first actuator fibers and a second controller that controls electricity application to the one or more second actuator fibers.

According to the arrangement, the temperature of the one or more first actuator fibers and the temperature of the one or more second actuator fibers can be controlled, and stretch or contraction of the first actuator fibers and the second actuator fibers can be controlled.

The actuator may be, for example, arranged such that the control unit causes the first controller and the second controller to make an amount obtained by subtracting the first displacement amount from a displacement amount of the first actuator unit equal to a displacement amount of the second actuator unit in a case where the displacement amount of the displacement member is equal to or larger than the first displacement amount and equal to or smaller than the maximum displacement amount.

According to the arrangement, since a situation where load is unbalanced between the first actuator unit and the second actuator unit does not occur, it is possible to obtain a more reliable actuator.

The actuator may be, for example, arranged such that the one or more first actuator fibers and the one or more second actuator fibers are aligned in a line.

According to the arrangement, load is held by the one or more first actuator fibers and the one or more second actuator fibers that are disposed in lines, it is possible to obtain a thinner actuator.

The actuator may be, for example, arranged such that the one or more first actuator fibers and the one or more second actuator fibers are disposed so as to be symmetrical with respect to an intermediate line between two actuator fibers located at ends of the line.

According to the arrangement, occurrence of a moment is suppressed in a case where the displacement member is moved by using the one or more first actuator fibers and the one or more second actuator fibers. It is therefore possible to obtain an actuator that is easier to use.

The actuator may be, for example, arranged such that each of the one or more first actuator fibers has a first spring shape including a first coil diameter, a first spring pitch, and a first wire diameter that is a wire diameter of the high polymer fiber bundle of the one or more first actuator fibers; each of the one or more second actuator fibers has a second spring shape including a second coil diameter that is equal to the first coil diameter, a second spring pitch that is equal to the first spring pitch, and a second wire diameter that is a wire diameter of the high polymer fiber bundle of the one or more second actuator fibers and is equal to the first wire diameter; and the length of each of the one or more first actuator fibers and the length of each of the one or more second actuator fibers are different from each other.

According to the arrangement, the one or more first actuator fibers and the one or more second actuator fibers are equal to each other in terms of strain that permits generated stress, and spring rates of the actuator fibers are inversely proportional to the lengths thereof. It is therefore possible to obtain an actuator that is easier to design.

The actuator may be, for example, arranged such that the one or more second actuator fibers includes a plurality of actuator fibers having different spring rates; and the plurality of actuator fibers having the different spring rates are different from each other in terms of a displacement range in which tension acts.

According to the arrangement, peaks of the driving efficiency of the actuator can be set at a plurality of loads. It is therefore possible to obtain an actuator having higher freedom of design.

The actuator may be, for example, arranged such that the one or more second actuator fibers includes actuator fibers having different lengths.

According to the arrangement, each of the plurality of second actuator fibers has a spring rate that is inversely proportional to the length thereof. It is therefore possible to obtain an actuator that is easier to design.

The actuator may be, for example, arranged such that one of conditions required to strain the one or more first actuator fibers and the one or more second actuator fibers to the same degree is that the displacement amount is equal to or larger than the first displacement amount and equal to or smaller than the maximum displacement amount.

According to the arrangement, maximum load that act on each of the actuator fibers is constant in a case where the displacement member is moved to a position where the one or more first actuator fibers and the one or more second actuator fibers are strained to the same degree. It is therefore possible to obtain a more reliable actuator.

The actuator may be, for example, arranged such that the ends include a first end and a second end; the one or more first actuator fibers and the one or more second actuator fibers are disposed in a first order from the intermediate line toward the first end and are disposed in the first order from the intermediate line toward the second end; and in the first order, reciprocals of the spring rates of the one or more first actuator fibers and the one or more second actuator fibers linearly increase or linearly decrease.

According to the arrangement, it is possible to obtain an actuator that has improved driving efficiency over a wide load range.

The actuator may be, for example, arranged such that the ends include a first end and a second end; the one or more first actuator fibers and the one or more second actuator fibers are disposed in a first order from the intermediate line toward the first end and are disposed in the first order from the intermediate line toward the second end; and in the first order, reciprocals of the spring rates of the one or more first actuator fibers and the one or more second actuator fibers exponentially increase or exponentially decrease.

According to the arrangement, it is possible to obtain an actuator that has improved driving efficiency over a wide load range.

The actuator may be, for example, arranged such that the ends include a first end; the one or more second actuator fibers located between the intermediate line and the first end and at the first end include at least n actuator fibers where n is an integer of 3 or larger, and a spring rate of an actuator fiber located between two actuator fibers included in any three actuator fibers included in the n actuator fibers is smaller than a largest one of spring rates of the three actuator fibers and is larger than a smallest one of the spring rates of the three actuator fibers.

According to the arrangement, a difference in temperature among any three actuator fibers is small. This increases thermal efficiency. It is therefore possible to obtain an actuator having further improved driving efficiency.

The actuator may be, for example, arranged such that the one or more first actuator fibers and the plurality of second actuator fibers having the different spring rates are aligned in a line, and reciprocals of the spring rates of the first actuator fibers and the plurality of second actuator fibers having the different spring rates linearly change, in at least part of the line, in one direction or another direction opposite to the one direction along the line.

According to the arrangement, it is possible to obtain an actuator that has improved driving efficiency over a wide load range.

The actuator may be, for example, arranged such that the one or more first actuator fibers and the plurality of second actuator fibers having the different spring rates are aligned in a line, and reciprocals of the spring rates of the first actuator fibers and the plurality of second actuator fibers having the different spring rates exponentially change, in at least part of the line, in one direction or another direction opposite to the one direction along the line.

According to the arrangement, it is possible to obtain an actuator that has improved driving efficiency over a wide load range.

It should be noted that these general or specific aspects may be implemented as a system.

Actuators according to embodiments are described below with reference to the drawings.

Each of the embodiments described below illustrates a general or specific example. Numerical values, shapes, materials, constituent elements, the way in which the constituent elements are disposed and connected, and the like are examples and do not limit the present disclosure. Among constituent elements described in the embodiments below, a constituent element that is not described in an independent claim indicating an uppermost concept is described as an optional constituent element. In the embodiments below, the expression "connected" encompasses direct connection and indirect connection using another member or the like.

Embodiment 1

Configuration of Actuator

FIG. 1 is a diagram illustrating an outline of an actuator 1a according to Embodiment 1.

The actuator 1a includes a first actuator unit 2 and a second actuator unit 3. The first actuator unit 2 and the second actuator unit 3 are located between a plate member 4a, which is an example of a base, and a plate member 5a, which is an example of a displacement member.

The first actuator unit 2 is constituted by two first actuator fibers 2a and 2b that are aligned in a line and have the same spring shape and the same length. The second actuator unit 3 is constituted by eight second actuator fibers 3a, 3b, 3c, 3d, 3e, 3f, 3g, and 3h that have the same spring shape as the first actuator fibers 2a and 2b and have a length that is one fifth of that of the first actuator fibers 2a and 2b. Note that the expression "the same spring shape" means that the first actuator fibers 2a and 2b and the second actuator fibers 3a, 3b, 3c, 3d, 3e, 3f, 3g, and 3h are the same in terms of coil diameter, spring pitch, and wire diameter of a high polymer fiber bundle that will be described later.

Since the second actuator unit 3 includes four times as many actuator fibers (the second actuator fibers 3a, 3b, 3c, 3d, 3e, 3f, 3g, and 3h) as actuator fibers (the first actuator fibers 2a and 2b) of the first actuator unit 2, and the second actuator fibers 3a, 3b, 3c, 3d, 3e, 3f, 3g, and 3h have a spring rate that is five times as high as that of the first actuator fibers 2a and 2b, the second actuator unit 3 has a spring rate that is twenty times as high as that of the first actuator unit 2. Since the length of the second actuator fibers 3a, 3b, 3c, 3d, 3e, 3f, 3g, and 3h is one fifth of that of the first actuator fibers 2a and 2b, a maximum displacement amount of the second actuator unit 3 is one fifth of that of the first actuator unit 2 during use of the actuator 1a.

Note that the first actuator unit 2 is not limited to the one including a plurality of actuator fibers and may be constituted by a single actuator fiber. Note also that the second actuator unit 3 is not limited to the one including a plurality of actuator fibers and may be constituted by a single actuator fiber.

Each of the first actuator fibers 2a and 2b and the second actuator fibers 3a, 3b, 3c, 3d, 3e, 3f, 3g, and 3h has a coil-like structure in which a high polymer fiber bundle including one or more twisted high polymer fibers (nylon fibers) is wound spirally. Surfaces of the first actuator fibers 2a and 2b and the second actuator fibers 3a, 3b, 3c, 3d, 3e, 3f, 3g, and 3h are silver-plated, and thus the first actuator fibers 2a and 2b and the second actuator fibers 3a, 3b, 3c, 3d, 3e, 3f, 3g, and 3h are resistively heated (electrically heated) upon application of electricity and stretch and contract in accordance with a change in temperature caused by the electric heating. In the present embodiment, a direction of twisting of the high polymer fiber bundle and a direction of winding of the spiral are the same as each other, and the entire length of each of the first actuator fibers 2a and 2b and the second actuator fibers 3a, 3b, 3c, 3d, 3e, 3f, 3g, and 3h contracts upon application of heat. A configuration of each of the actuator fibers will be described later in detail.

One ends of the first actuator fibers 2a and 2b are connected to the plate member 4a via connection members 6a and 6b, respectively. Similarly, one ends of the second actuator fibers 3a, 3b, 3c, 3d, 3e, 3f, 3g, and 3h are connected to the plate member 4a via connection members 8a, 8b, 8c, 8d, 8e, 8f, 8g, and 8h, respectively.

The other ends of the first actuator fibers 2a and 2b are connected to the plate member 5a via connection members 7a and 7b, respectively. One ends of connection members 9a, 9b, 9c, 9d, 9e, 9f, 9g, and 9h are connected to the other ends of the second actuator fibers 3a, 3b, 3c, 3d, 3e, 3f, 3g, and 3h, respectively.

Each of the connection members 6a and 6b, the connection members 7a and 7b, the connection members 8a, 8b, 8c, 8d, 8e, 8f, 8g, and 8h, and the connection members 9a, 9b, 9c, 9d, 9e, 9f, 9g, and 9h is, for example, made of a linear material. According to this configuration, the actuator 1a can be given flexibility against bending. The material can be high polymer fibers, carbon fibers, a metal wire, or the like. The high polymer fibers and the carbon fibers are light in weight. The metal wire may be a material, such as a superelastic alloy, having flexibility against bending.

Through-holes pass through the plate member 5a in a top-to-bottom direction of FIG. 1, and the connection members 9a, 9b, 9c, 9d, 9e, 9f, 9g, and 9h are inserted into the through-holes. The plate member 5a is slidable in the top-to-bottom direction relative to the connection members 9a, 9b, 9c, 9d, 9e, 9f, 9g, and 9h. End members 10a, 10b, 10c, 10d, 10e, 10f, 10g, and 10h having electric conductivity are connected to the other ends of the connection members 9a, 9b, 9c, 9d, 9e, 9f, 9g, and 9h, respectively. When the plate member 5a connected to the first actuator fibers 2a and 2b moves in the downward direction of FIG. 1 and makes contact with the end members 10a, 10b, 10c, 10d, 10e, 10f, 10g, and 10h, tension also acts on the second actuator fibers 3a, 3b, 3c, 3d, 3e, 3f, 3g, and 3h via the connection members 9a, 9b, 9c, 9d, 9e, 9f, 9g, and 9h.

The actuator 1a is driven by a control unit 11a. More specifically, the control unit 11a includes a power source 12a, a controller 13a (including a first controller 13a1 and a second controller 13a2), and switches 15a and 15b. The first controller 13a1 switches a connection state between a wire 14a and the power source 12a by switching on/off the switch 15a and thus controls electricity application to the first actuator fibers 2a and 2b. The second controller 13a2 switches a connection state between a wire 14b and the power source 12a by switching on/off the switch 15b and thus controls electricity application to the second actuator fibers 3a, 3b, 3c, 3d, 3e, 3f, 3g, and 3h. The wire 14a is electrically connected to the first actuator fibers 2a and 2b via a first electrode unit provided on the plate member 4a and via the connection members 6a and 6b. Similarly, the wire 14b is electrically connected to the second actuator fibers 3a, 3b, 3c, 3d, 3e, 3f, 3g, and 3h via a second electrode unit provided on the plate member 4a and via the connection members 8a, 8b, 8c, 8d, 8e, 8f, 8g, and 8h. The plate member 4a is configured so that the first electrode unit and the second electrode unit are not electrically conductive with each other. A voltage converter (not illustrated) is provided between the power source 12a and the switch 15a and between the power source 12a and the switch 15b. These voltage converters make voltages applied to the first actuator fibers 2a and 2b and to the second actuator fibers 3a, 3b, 3c, 3d, 3e, 3f, 3g, and 3h different from each other.

In a case where the connection members 6a and 6b and the connection members 8a, 8b, 8c, 8d, 8e, 8f, 8g, and 8h are made of an electrically conductive material, the connection members 6a and 6b and the connection members 8a, 8b, 8c, 8d, 8e, 8f, 8g, and 8h can be used as wires as they are. In a case where the connection members 6a and 6b and the connection members 8a, 8b, 8c, 8d, 8e, 8f, 8g, and 8h are made of a material that is not electrically conductive, electrical connection between the wire 14a and the first actuator fibers 2a and 2b or electrical connection between the wire 14b and the second actuator fibers 3a, 3b, 3c, 3d, 3e, 3f, 3g, and 3h may be secured, for example, by metal-plating surfaces of the connection members 6a and 6b and the connection members 8a, 8b, 8c, 8d, 8e, 8f, 8g, and 8h or forming an electrically conductive material on the surfaces. Although in the present embodiment, the power source 12a and the first actuator fibers 2a and 2b or the power source 12a and the second actuator fibers 3a, 3b, 3c, 3d, 3e, 3f, 3g, and 3h are electrically connected to each other via the plate member 4a, the connection members 6a and 6b, the connection members 8a, 8b, 8c, 8d, 8e, 8f, 8g, and 8h, the present embodiment is not limited to this. The wire 14a and the first actuator fibers 2a and 2b or the wire 14b and the second actuator fibers 3a, 3b, 3c, 3d, 3e, 3f, 3g, and 3h may be directly connected to each other.

Furthermore, a wire 14c is connected to the power source 12a. The wire 14c is connected to the plate member 5a. The wire 14c is electrically connected to the first actuator fibers 2a and 2b via a third electrode unit provided on the plate member 5a and via connection members 7a and 7b. Furthermore, the wire 14c is electrically connected to the second actuator fibers 3a, 3b, 3c, 3d, 3e, 3f, 3g, and 3h via a fourth electrode unit provided on the plate member 5a and via the end members 10a, 10b, 10c, 10d, 10e, 10f, 10g, and 10h and the connection members 9a, 9b, 9c, 9d, 9e, 9f, 9g, and 9h. Since the fourth electrode unit that is electrically connected to the wire 14c is provided on a lower surface (surface on the lower side in FIG. 1) of the plate member 5a, electrical connection is established between the wire 14c and the end members 10a, 10b, 10c, 10d, 10e, 10f, 10g, and 10h in a case where the end members 10a, 10b, 10c, 10d, 10e, 10f, 10g, and 10h are in contact with the plate member 5a.

In a case where the connection members 7a and 7b and the connection members 9a, 9b, 9c, 9d, 9e, 9f, 9g, and 9h are made of an electrically conductive material, the connection members 7a and 7b and the connection members 9a, 9b, 9c, 9d, 9e, 9f, 9g, and 9h can be used as wires as they are. In a case where the connection members 7a and 7b and the connection members 9a, 9b, 9c, 9d, 9e, 9f, 9g, and 9h are made of a material that is not electrically conductive, electrical connection between the wire 14c and the first actuator fibers 2a and 2b or electrical connection between the wire 14c and the second actuator fibers 3a, 3b, 3c, 3d, 3e, 3f, 3g, and 3h may be secured, for example, by metal-plating surfaces of the connection members 7a and 7b and the connection members 9a, 9b, 9c, 9d, 9e, 9f, 9g, and 9h or forming an electrically conductive material on the surfaces. An insulation process is performed between the connection members 9a, 9b, 9c, 9d, 9e, 9f, 9g, and 9h and the plate member 5a (e.g., in the through-holes of the plate member 5a) so that the connection members 9a, 9b, 9c, 9d, 9e, 9f, 9g, and 9h are not electrically connected to the wire 14c without the end members 10a, 10b, 10c, 10d, 10e, 10f, 10g, and 10h.

Next, operation of the actuator 1a is described.

In the actuator 1a illustrated in FIG. 1, the plate member 4a is fixed, and the plate member 5a is configured to be freely movable in the top-bottom direction of FIG. 1 in a state where load is applied in the downward direction of FIG. 1. In a case where the load is small, the load is supported by the first actuator fibers 2a and 2b, and the plate member 5a and the end members 10a, 10b, 10c, 10d, 10e, 10f, 10g, and 10h do not make contact with each other. In a case where the load is equal to or larger than a certain value, the load cannot be supported by the first actuator fibers 2a and 2b, and the plate member 5a and the end members 10a, 10b, 10c, 10d, 10e, 10f, 10g, and 10h make contact with each other. As a result, the load is supported by the first actuator fibers 2a and 2b and the second actuator fibers 3a, 3b, 3c, 3d, 3e, 3f, 3g, and 3h. In the present embodiment, an amount by which the plate member 5a is displaced relative to the plate member 4a when the end members 10a, 10b, 10c, 10d, 10e, 10f, 10g, and 10h make contact with or are separated from the plate member 5a is referred to as a first displacement amount. An amount by which the plate member 5a is displaced relative to the plate member 4a when the load is maximum is referred to as a maximum displacement amount.

In a case where the actuator 1a is in operation, the controller 13a of the control unit 11a short-circuits or open-circuits the switches 15a and 15b. In a case where the displacement amount of the plate member 5a relative to the plate member 4a is smaller than the first displacement amount, the first actuator fibers 2a and 2b is electrically heated, and contracting force is generated upward (in the upward direction in FIG. 1) in the first actuator fibers 2a and 2b. Meanwhile, in a case where the displacement amount of the plate member 5a relative to the plate member 4a is equal to or larger than the first displacement amount and equal to or smaller than the maximum displacement amount, not only the first actuator fibers 2a and 2b, but also the second actuator fibers 3a, 3b, 3c, 3d, 3e, 3f, 3g, and 3h are electrically heated, and upward contracting force is generated in all of the actuator fibers.

In the actuator 1a according to the present embodiment, in a case where the displacement amount of the plate member 5a relative to the plate member 4a is smaller than the first displacement amount, the temperature of the first actuator fibers 2a and 2b is controlled by application of electricity to the first actuator fibers 2a and 2b and the temperature of the second actuator fibers 3a, 3b, 3c, 3d, 3e, 3f, 3g, and 3h is not controlled, so that load is held by the first actuator unit 2. Meanwhile, in a case where the displacement amount of the plate member 5a relative to the plate member 4a is equal to or larger than the first displacement amount and equal to or smaller than the maximum displacement amount, the temperature of the first actuator fibers 2a and 2b is controlled by application of electricity to the first actuator fibers 2a and 2b and the temperature of the second actuator fibers 3a, 3b, 3c, 3d, 3e, 3f, 3g, and 3h is controlled by application of electricity to the second actuator fibers 3a, 3b, 3c, 3d, 3e, 3f, 3g, and 3h, so that the load is held by both of the first actuator unit 2 and the second actuator unit 3.

Configuration of Actuator Fiber

Figure 16:
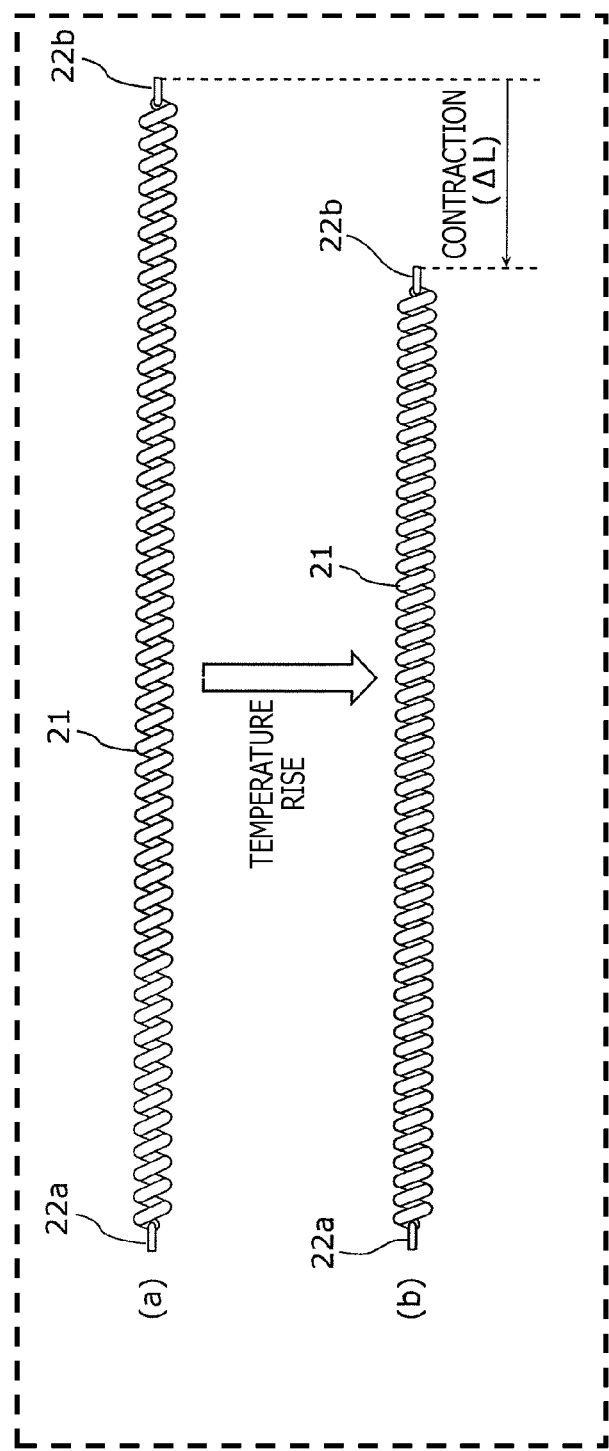
FIG. 16 is a diagram illustrating an outline of an actuator fiber.

Next, a configuration of an actuator fiber is described in detail. FIG. 16 is a diagram illustrating an outline of a single actuator fiber 21. Actuator fibers that have similar configurations to the actuator fiber 21 but have different sizes, shapes, and/or the like are used as the first actuator fibers 2a and 2b and the second actuator fibers 3a, 3b, 3c, 3d, 3e, 3f, 3g, and 3h. Attachment units 22a and 22b are provided at both ends of the actuator fiber 21, and a distance between the attachment units 22a and 22b changes in accordance with stretch or contraction of the actuator fiber 21. The actuator fiber 21 has a structure in which a high polymer fiber bundle including a plurality of twisted high polymer fibers is wound spirally about a virtual axis. The high polymer fiber bundle is a bundle of a plurality of high polymer fibers but is not limited to this. The high polymer fiber bundle may be a single twisted high polymer fiber. The high polymer fiber bundle is, for example, made of a material such as nylon or polyethylene. Use of these materials makes it possible to make generated displacement large. Other high-polymer materials may be used. For example, fibers having a diameter of 0.13 mm are used as the high polymer fibers. This size allows the actuator fiber 21 processed in a coil shape to have an external diameter of less than 1 mm, thereby making it easy to configure the actuator fiber 21 as a fabric. However, the present embodiment is not limited to this. Thicker actuator fibers may be used to increase generated force per fiber or thinner actuator fibers may be used so that the actuator fibers can be configured as a thinner fabric.

FIG. 16 is a diagram illustrating an outline of an actuator fiber. In a case where the actuator fiber 21 in the state illustrated in FIG. 16(a) is heated and the temperature thereof rises, the twisted high polymer fiber bundle is untwisted. This untwisting operation occurs in each portion of the coil shape (in the actuator fiber 21), the spiral angle of the coil changes, and the actuator fiber 21 contracts by ΔL as illustrated in FIG. 16(b). When the temperature of the actuator fiber 21 drops due to natural heat radiation or the like, the high polymer fiber bundle is twisted again, and the high polymer fiber bundle stretches to the state illustrated in FIG. 16(a). Such an actuator is a light-weight and flexible actuator whose output per mass is large. The temperature of the actuator fiber 21 can be changed, for example, by a method for changing the temperature of gas and/or liquid around the actuator fiber 21 or a method for bringing a heat generator into contact with the actuator fiber 21, but a method for electrically heating the actuator fiber 21 by plating surfaces of the high polymer fibers with silver or the like to give the high polymer fibers electric conductivity and passing electricity therethrough is easy to handle. Adjustment of the temperature of the actuator fiber 21 using electric heating can be performed by adjusting an applied voltage and/or electric current or by adjusting a ratio of a period of electricity application and a period of the absence of electricity application like PWM driving.

Figure 17:
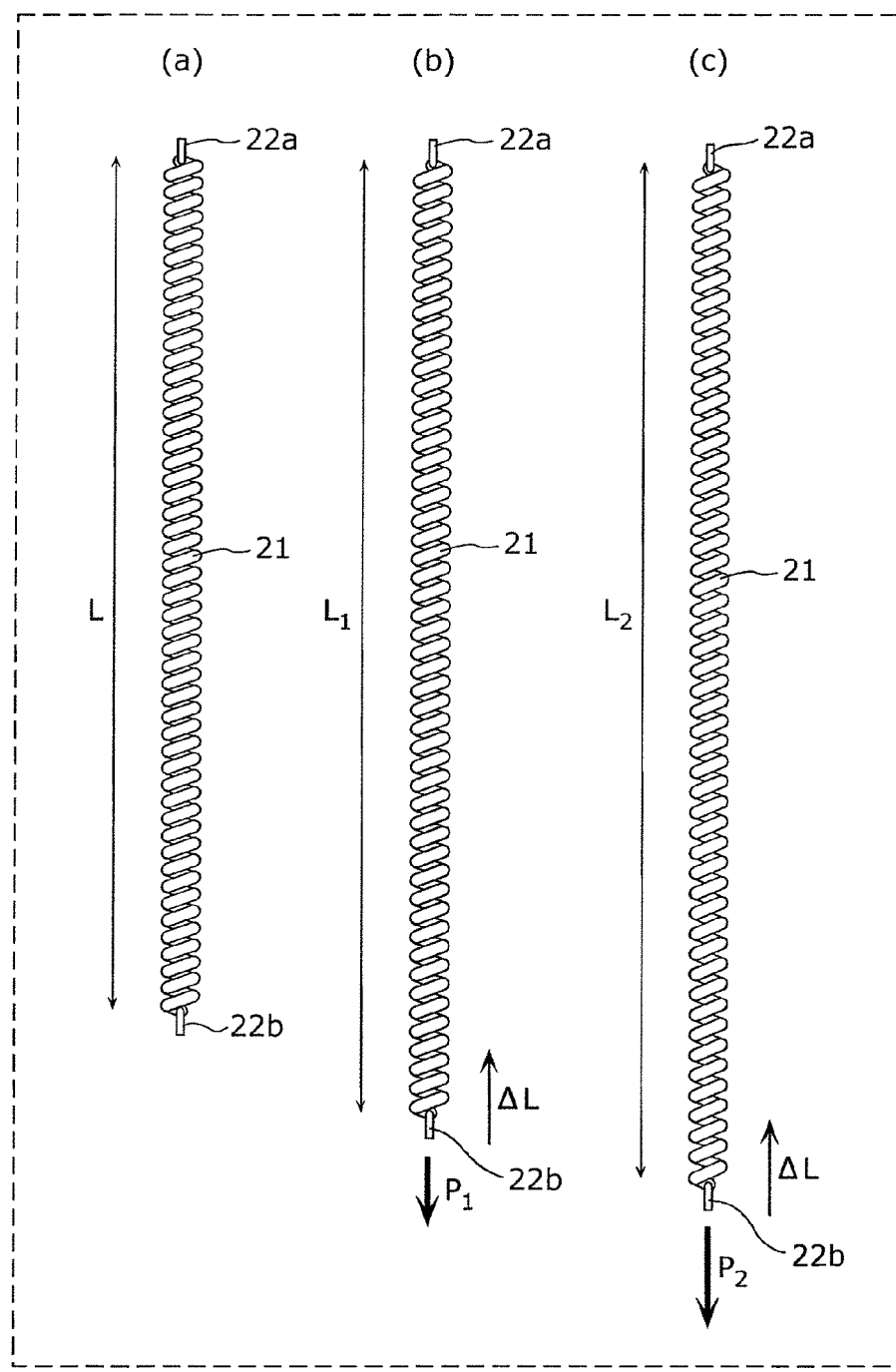
FIG. 17 is a diagram illustrating an outline of operation performed in a case where different loads are applied to an actuator fiber.

FIG. 17 is a diagram illustrating an outline of an operation performed in a case where different loads are applied to the actuator fiber 21. The actuator fiber 21 has both properties as a coil spring and properties as an actuator that generates driving force. In a case where the attachment unit 22a of the actuator fiber 21 having a natural length L illustrated in FIG. 17(a) is fixed and load P1 is applied to the attachment unit 22b in the downward direction of FIG. 17, the actuator fiber 21 shifts to the state illustrated in FIG. 17(b). A length L1 of the actuator fiber 21 in this state is expressed by $L1=L+P1/k$ where k is a spring rate of the actuator fiber 21 as a coil spring. When the temperature of the actuator fiber 21 is increased in this state, the actuator fiber 21 generates driving force and is displaced by ΔL in the upward direction of FIG. 17 against the load P1. The force Fa thus generated by the actuator fiber 21 is expressed by $Fa=k\Delta L$ and is a function of a change in temperature of the actuator fiber 21. Accordingly, the generated force Fa and ΔL generated by the force Fa can be adjusted by adjusting a change in temperature of the actuator fiber 21. A relationship between a change in temperature of the actuator fiber 21 and ΔL has small non-linearity and can be approximated by a linear shape.

Meanwhile, in a case where load P2 (>P1) is applied to the attachment unit 22b in the downward direction of FIG. 17, the actuator fiber 21 shifts to the state illustrated in FIG. 17(c). A length L2 of the actuator fiber 21 in this state is expressed by $L2=L+P2/k$. When the temperature of the actuator fiber 21 is increased in this state, the actuator fiber 21 is displaced by ΔL in the upward direction of FIG. 17 against the load P2, as in the case of FIG. 17(b). The force Fa generated by the actuator fiber 21 is expressed by $Fa=k\Delta L$. That is, the displacement of the actuator fiber 21 is not affected much by load and markedly depends on a change in temperature. Accordingly, driving efficiency $\eta=P\Delta L/W$, which is a ratio of work to input thermal energy, becomes higher as the load P becomes higher (the driving efficiency η becomes lower as the load P becomes higher) where W is thermal energy needed to generate the force Fa, i.e., the displacement ΔL. An upper limit of the load P depends on properties of the material of the actuator fiber 21, and increasing maximum load in a range in which a repetition lifetime falls within the specifications is important for an improvement in driving efficiency.

Comparative examples of the actuator is described below before effects of the actuator 1a according to the present embodiment are described.

Comparative Example 1

Figure 18:
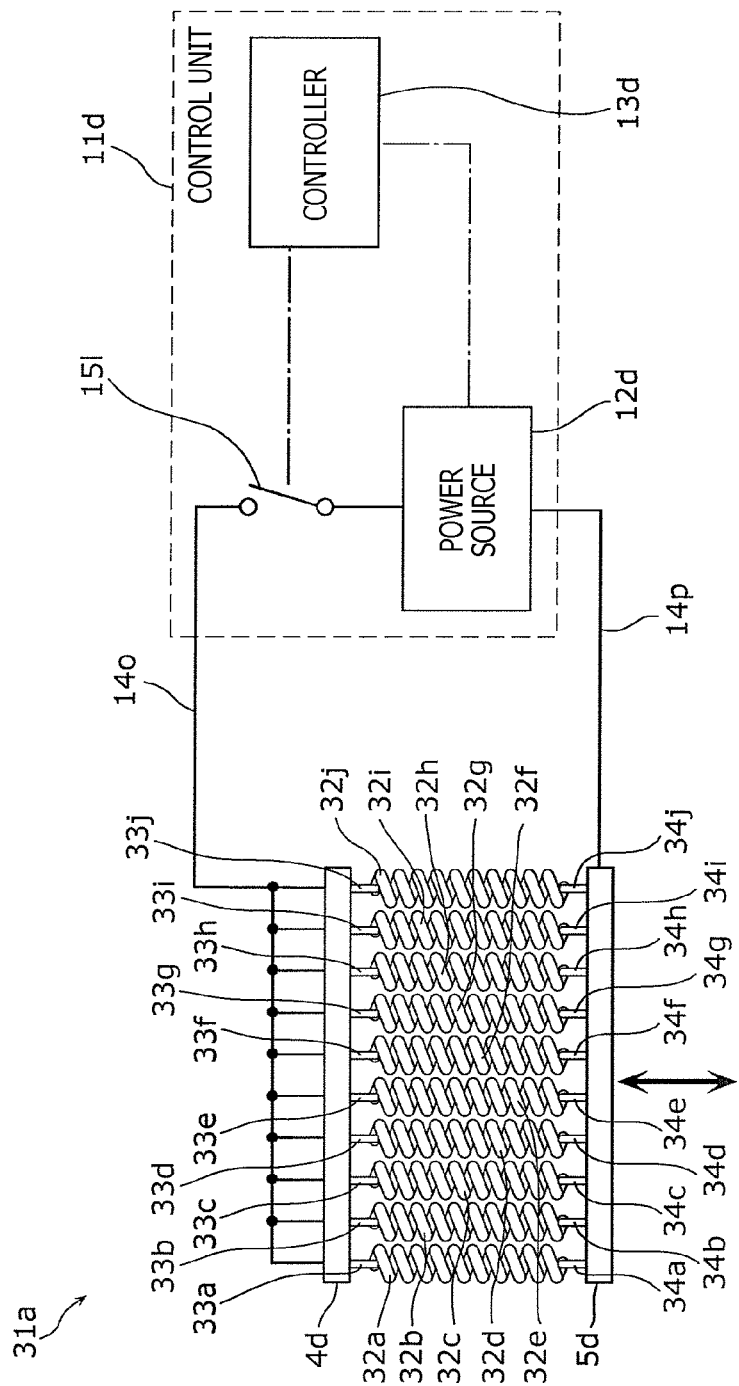
FIG. 18 is a diagram illustrating an outline of an actuator according to Comparative Example 1 using actuator fibers.

FIG. 18 is a diagram illustrating an outline of an actuator 31a according to Comparative Example 1 using actuator fibers. The actuator 31a includes actuator fibers 32a, 32b, 32c, 32d, 32e, 32f, 32g, 32h, 32i, and 32j in parallel with each other. Each of the actuator fibers 32a, 32b, 32c, 32d, 32e, 32f, 32g, 32h, 32i, and 32j has a structure in which twisted nylon fibers are wound in a coil. Surfaces of the actuator fibers 32a, 32b, 32c, 32d, 32e, 32f, 32g, 32h, 32i, and 32j are silver-plated, and the actuator fibers 32a, 32b, 32c, 32d, 32e, 32f, 32g, 32h, 32i, and 32j are resistively heated by application of electricity.

One ends of the actuator fibers 32a, 32b, 32c, 32d, 32e, 32f, 32g, 32h, 32i, and 32j are connected to a plate member 4d via connection members 33a, 33b, 33c, 33d, 33e, 33f, 33g, 33h, 33i, and 33j, respectively. The other ends of the actuator fibers 32a, 32b, 32c, 32d, 32e, 32f, 32g, 32h, 32i, and 32*j* are connected to a plate member 5*d* via connection members 34*a*, 34*b*, 34*c*, 34*d*, 34*e*, 34*f*, 34*g*, 34*h*, 34*i*, and 34*j*, respectively. The connection members 33*a*, 33*b*, 33*c*, 33*d*, 33*e*, 33*f*, 33*g*, 33*h*, 33*i*, and 33*j* and the connection members 34*a*, 34*b*, 34*c*, 34*d*, 34*e*, 34*f*, 34*g*, 34*h*, 34*i*, and 34*j* are electrically conductive fibrous members.

The actuator 31*a* is driven by a control unit 11*d*. The control unit 11*d* includes a power source 12*d*, a controller 13*d*, and a switch 15*l*. The switch 15*l* switches a connection state between a wire 14*o* and the power source 12*d*. The wire 14*o* is electrically connected to the actuator fibers 32*a*, 32*b*, 32*c*, 32*d*, 32*e*, 32*f*, 32*g*, 32*h*, 32*i*, and 32*j* via the plate member 4*d* and the connection members 33*a*, 33*b*, 33*c*, 33*d*, 33*e*, 33*f*, 33*g*, 33*h*, 33*i*, and 33*j*. A wire 14*p* is connected to the power source 12*d*. The wire 14*p* is connected to the plate member 5*d*. The wire 14*p* is electrically connected to the actuator fibers 32*a*, 32*b*, 32*c*, 32*d*, 32*e*, 32*f*, 32*g*, 32*h*, 32*i*, and 32*j* via the plate member 5*d* and the connection members 34*a*, 34*b*, 34*c*, 34*d*, 34*e*, 34*f*, 34*g*, 34*h*, 34*i*, and 34*j*.

Next, operation of the actuator 31*a* according to Comparative Example 1 is described.

In the actuator 31*a* illustrated in FIG. 18, the plate member 4*d* is fixed, and the plate member 5*d* is configured to be freely movable in the top-bottom direction of FIG. 18 in a state where load is applied in the downward direction of FIG. 18. In a case where the actuator 31*a* is in operation, the controller 13*d* switches on the switch 15*l*. This causes the actuator fibers 32*a*, 32*b*, 32*c*, 32*d*, 32*e*, 32*f*, 32*g*, 32*h*, 32*i*, and 32*j* to be electrically heated, thereby generating contraction force with respect to the plate member 5*d* in the actuator 31*a* in the upward direction of FIG. 18.

Figure 19:
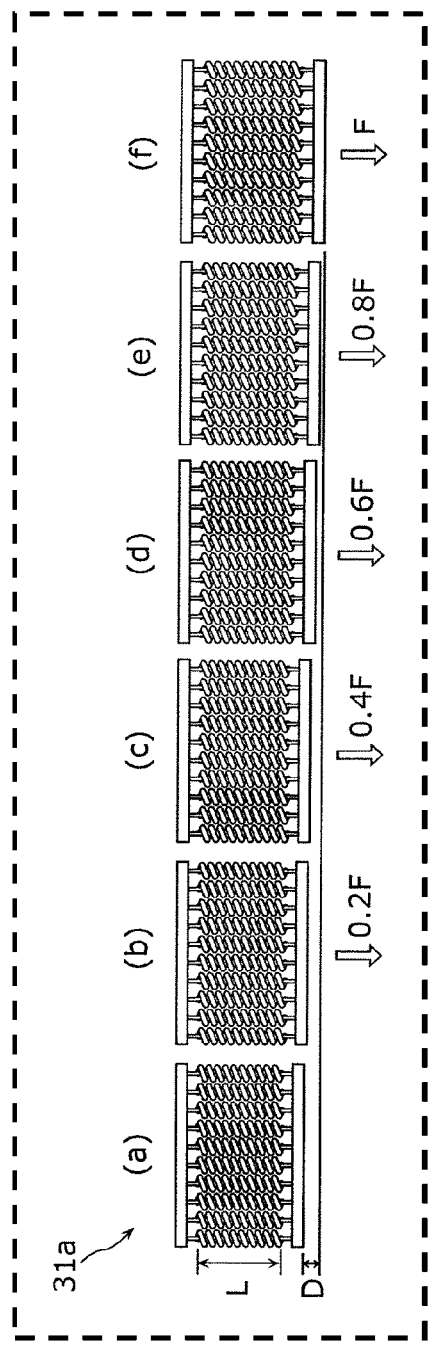
FIG. 19 is a diagram illustrating an outline of a case where various loads are applied to the actuator according to Comparative Example 1.

FIG. 19 is a diagram illustrating an outline of a case where various loads are applied to the actuator 31*a* according to Comparative Example 1. FIG. 19(*a*) illustrates a state where no load is applied to the plate member 5*d* and the actuator fibers have a natural length L (e.g., 20 cm). From this state, the load is gradually increased, and FIG. 19(*f*) illustrates a state where load F (e.g., 8 N) is applied and the plate member 5*d* is displaced by D (e.g., 26 cm). Assume that a change in temperature needed to generate deformation of ΔL (e.g., 3 cm) in the actuator is ΔT (e.g., 100° C.), input energy needed for the change in temperature is J (e.g., 24 J), and driving efficiency η is η=FΔL/J (e.g., 1%). FIG. 20 is a table illustrating driving efficiency of the actuator 31*a* according to Comparative Example 1 in the states illustrated in FIG. 19. In the following description, for simplification of the description, it is assumed that force generated in the actuator fibers is proportional to a change in temperature, and the change in temperature is proportional to input energy and is inversely proportional to the volume of the actuator fibers.

The load is increased by 0.2 F increments in the order from FIG. 20(*a*) to FIG. 20(*f*). A displacement amount of the plate member 5*d* increases by 0.2 D increments as the load increases since the spring rate of the actuator fibers is constant. Meanwhile, a change in temperature that is needed to displace the plate member 5*d* from each state by ΔL in the upward direction of FIG. 19 is always ΔT irrespective of the load. Accordingly, the input energy is also always J. As a result, the driving efficiency of the actuator 31*a* increases by 0.2 increments in accordance with the load since the displacement and the input energy are constant irrespective of the change of the load. The driving efficiency of the actuator 31*a* is maximized in FIG. 20(*f*) in which the load is maximum but becomes lower as the load becomes lower.

Comparative Example 2

Figure 21:
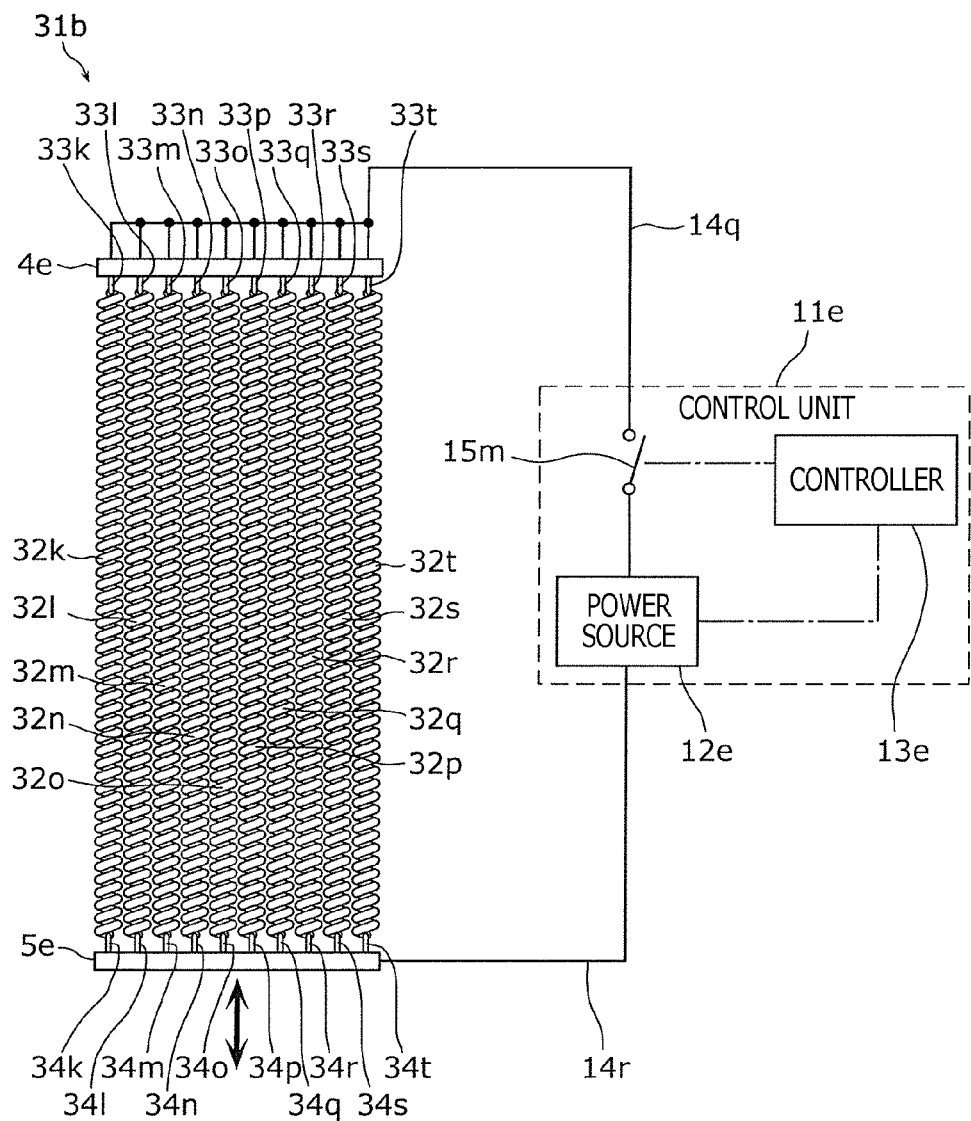
FIG. 21 is a diagram illustrating an outline of an actuator according to Comparative Example 2 using actuator fibers.

FIG. 21 is a diagram illustrating an outline of an actuator 31*b* according to Comparative Example 2 that has a different configuration using actuator fibers. The configuration in FIG. 21 is different from that in FIG. 18 in that the actuator 31*b* is made more flexible and is easier to be displaced by using actuator fibers that have the same spring shape and have a length that is five times as long as that in FIG. 18. The actuator 31*b* includes actuator fibers 32*k*, 32*l*, 32*m*, 32*n*, 32*o*, 32*p*, 32*q*, 32*r*, 32*s*, and 32*t* in parallel with each other. Each of the actuator fibers 32*k*, 32*l*, 32*m*, 32*n*, 32*o*, 32*p*, 32*q*, 32*r*, 32*s*, and 32*t* has a structure in which twisted nylon fibers are wound in a coil. Surfaces of the actuator fibers 32*k*, 32*l*, 32*m*, 32*n*, 32*o*, 32*p*, 32*q*, 32*r*, 32*s*, and 32*t* are silver-plated, and the actuator fibers 32*k*, 32*l*, 32*m*, 32*n*, 32*o*, 32*p*, 32*q*, 32*r*, 32*s*, and 32*t* are resistively heated by application of electricity.

One ends of the actuator fibers 32*k*, 32*l*, 32*m*, 32*n*, 32*o*, 32*p*, 32*q*, 32*r*, 32*s*, and 32*t* are connected to a plate member 4*e* via connection members 33*k*, 33*l*, 33*m*, 33*n*, 33*o*, 33*p*, 33*q*, 33*r*, 33*s*, and 33*t*, respectively. The other ends of the actuator fibers 32*k*, 32*l*, 32*m*, 32*n*, 32*o*, 32*p*, 32*q*, 32*r*, 32*s*, and 32*t* are connected to a plate member 5*e* via connection members 34*k*, 34*l*, 34*m*, 34*n*, 34*o*, 34*p*, 34*q*, 34*r*, 34*s*, and 34*t*, respectively. The connection members 33*k*, 33*l*, 33*m*, 33*n*, 33*o*, 33*p*, 33*q*, 33*r*, 33*s*, and 33*t* and the connection members 34*k*, 34*l*, 34*m*, 34*n*, 34*o*, 34*p*, 34*q*, 34*r*, 34*s*, and 34*t* are electrically conductive fibrous members.

The actuator 31*b* is driven by a control unit 11*e*. The control unit 11*e* includes a power source 12*e*, a controller 13*e*, and a switch 15*m*. The switch 15*m* switches a connection state between a wire 14*q* and the power source 12*e*. The wire 14*q* is electrically connected to the actuator fibers 32*k*, 32*l*, 32*m*, 32*n*, 32*o*, 32*p*, 32*q*, 32*r*, 32*s*, and 32*t* via the plate member 4*e* and the connection members 33*k*, 33*l*, 33*m*, 33*n*, 33*o*, 33*p*, 33*q*, 33*r*, 33*s*, and 33*t*. A wire 14*r* is connected to the power source 12*e*. The wire 14*r* is connected to the plate member 5*e*. The wire 14*r* is electrically connected to the actuator fibers 32*k*, 32*l*, 32*m*, 32*n*, 32*o*, 32*p*, 32*q*, 32*r*, 32*s*, and 32*t* via the plate member 5*e* and the connection members 34*k*, 34*l*, 34*m*, 34*n*, 34*o*, 34*p*, 34*q*, 34*r*, 34*s*, and 34*t*.

Next, operation of the actuator 31*b* according to Comparative Example 2 is described.

In the actuator 31*b* illustrated in FIG. 21, the plate member 4*e* is fixed, and the plate member 5*e* is configured to be freely movable in the top-bottom direction of FIG. 21 in a state where load is applied in the downward direction of FIG. 21. In a case where the actuator 31*b* is in operation, the controller 13*e* switches on the switch 15*m*. This causes the actuator fibers 32*k*, 32*l*, 32*m*, 32*n*, 32*o*, 32*p*, 32*q*, 32*r*, 32*s*, and 32*t* to be electrically heated, thereby generating contraction force with respect to the plate member 5*e* in the actuator 31*b* in the upward direction of FIG. 21.

Figure 22:
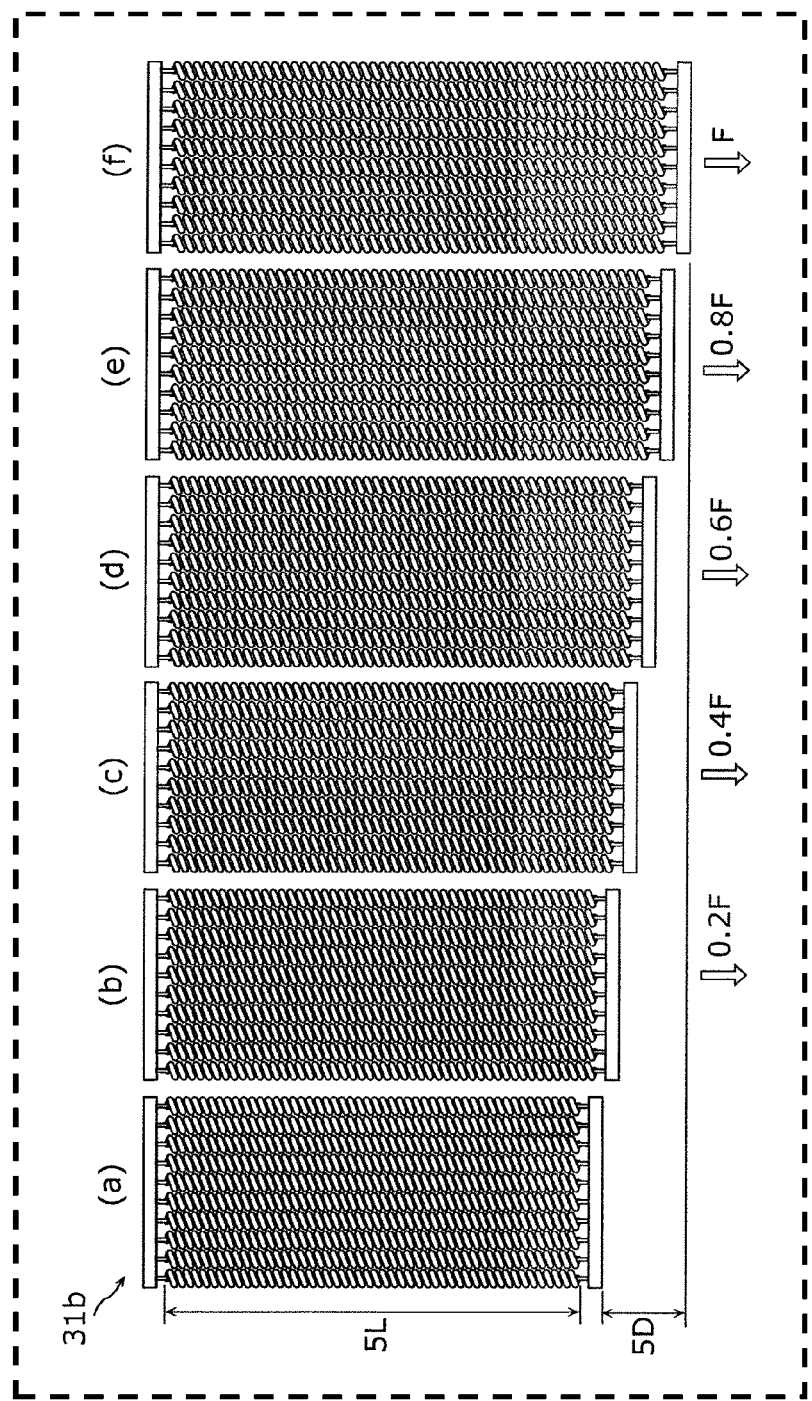
FIG. 22 is a diagram illustrating an outline of a case where various loads are applied to the actuator according to Comparative Example 2.

FIG. 22 is a diagram illustrating an outline of a case where various loads are applied to the actuator 31*b* according to Comparative Example 2. FIG. 22(*a*) illustrates a state where no load is applied to the plate member 5*e* and the actuator fibers have a natural length 5L. From this state, the load is gradually increased, and FIG. 22(*f*) illustrates a state where load F is applied and the plate member 5*e* is displaced by 5D. Since the length of the actuator fibers is five times as long as that in the actuator 31*a* of FIG. 18, a displacement amount is five times as large as that in the actuator 31*a* of FIG. 18 under the same load F. A change in temperature that is needed to generate displacement of ΔL in this actuator is 0.2ΔT since strain generated in the actuator fibers is one fifth of that in the actuator 31*a* of FIG. 18. However, the volume of the actuator fibers is five times as large as that of the actuator 31*a* of FIG. 18, input energy needed for the change in temperature is eventually J.

FIG. 23 is a table illustrating driving efficiency of the actuator 31b according to Comparative Example 2 in the states of FIG. 22. The load is increased by 0.2 F increments in the order from FIG. 23(a) to FIG. 23(f). A displacement amount of the plate member 5e increases by D increments as the load increases since the spring rate of the actuator fibers is constant. Meanwhile, a change in temperature that is needed to displace the plate member 5e from each state by ΔL in the upward direction of FIG. 22 is always 0.2ΔT irrespective of the load. Accordingly, the input energy is also always J. Eventually, the input energy that is needed to generate the displacement ΔL is kept the same even in a case where the length of actuator fibers is changed if a difference in thermal loss resulting from heat radiation is ignored. As a result, the driving efficiency of the actuator 31b increases by 0.2η increments in accordance with the load since the displacement and the input energy are constant irrespective of the change of the load. The driving efficiency of the actuator 31b is maximized in FIG. 23(f) in which the load is maximum but becomes lower as the load becomes lower, as in the case of the actuator 31a.

Effects of Actuator

Next, effects of the actuator 1a according to the present embodiment are described.

Figures 2, 3:
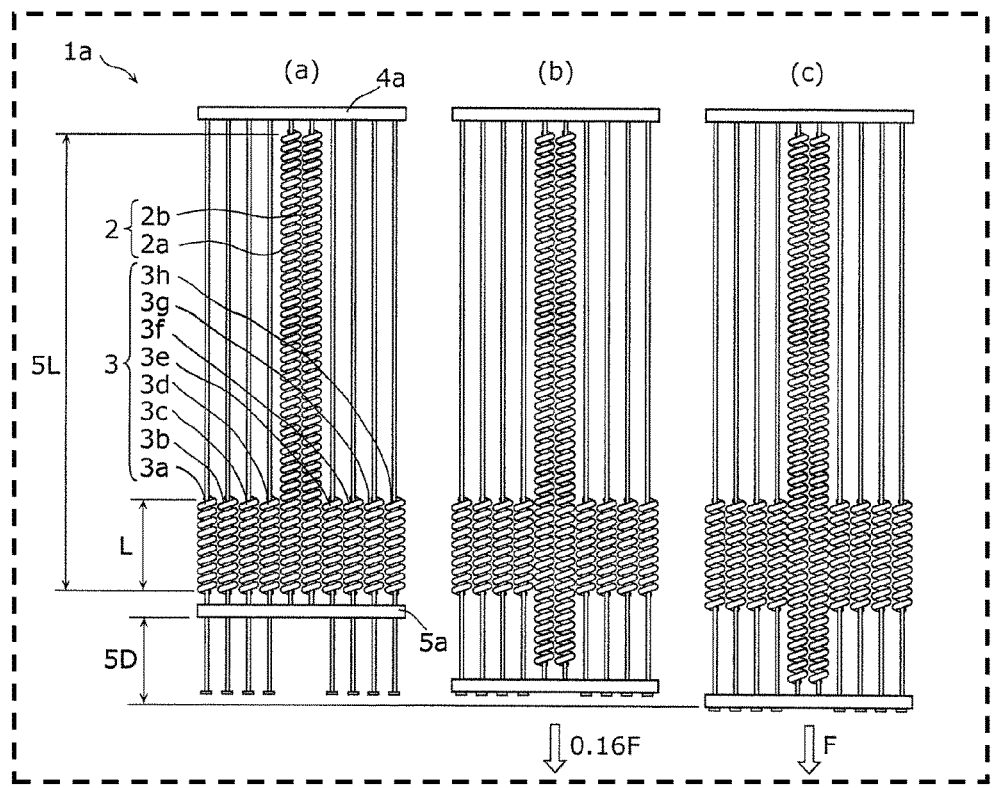
FIG. 2 is a diagram illustrating an outline of a case where various loads are applied to the actuator according to Embodiment 1.
FIG. 3 is a table illustrating driving efficiency of the actuator according to Embodiment 1.

FIG. 2 is a diagram illustrating an outline of a case where various loads are applied to the actuator 1a according to the present embodiment. In the actuator 1a, a natural length of the first actuator fibers 2a and 2b is 5L, and a natural length of the second actuator fibers 3a, 3b, 3c, 3d, 3e, 3f, 3g, and 3h is L. When the plate member 5a is displaced by 4D relative to the plate member 4a (when a displacement amount is 4D), the end members 10a, 10b, 10c, 10d, 10e, 10f, 10g, and 10h and the plate member 5a make contact with each other. Note that it is assumed that values of L, D, F, T, J, and η used for description of the present embodiment are identical to those in Comparative Example 1.

FIG. 2(a) illustrates a state where no load is applied to the plate member 5a and each of the first actuator fibers 2a and 2b and the second actuator fibers 3a, 3b, 3c, 3d, 3e, 3f, 3g, and 3h has a natural length. FIG. 2(b) illustrates a state where the plate member 5a is displaced by 4D relative to the plate member 4a and the plate member 5a and the end members 10a, 10b, 10c, 10d, 10e, 10f, 10g, and 10h are about to make contact with each other. In this state, the load is equal to load that achieve the state illustrated in FIG. 22(e) with the use of the first actuator fibers 2a and 2b whose number is one fifth of that in FIG. 22(e) and is therefore 0.16 F. FIG. 2(c) illustrates a state where the plate member 5a is displaced by 5D relative to the plate member 4a and the plate member 5a and the end members 10a, 10b, 10c, 10d, 10e, 10f, 10g, and 10h make contact with each other. In this state, the load is equal to the sum of load that achieve the state illustrated in FIG. 22(f) with the use of the first actuator fibers 2a and 2b whose number is one fifth of that in FIG. 22(f) and load that achieves the state illustrated in FIG. 19(f) with the use of the second actuator fibers 3a, 3b, 3c, 3d, 3e, 3f, 3g, and 3h whose number is four fifths of that in FIG. 19(f) and is therefore F. In this state, the first actuator fibers 2a and 2b having a natural length of 5L is displaced by 5D, and the second actuator fibers 3a, 3b, 3c, 3d, 3e, 3f, 3g, and 3h having a natural length of L are displaced by D, and strain and tension are equal to each other in all of the actuator fibers. In the present embodiment, a maximum displacement amount of the plate member 5a relative to the plate member 4a is a displacement amount 5D. In a case where the displacement amount of the plate member 5a relative to the plate member 4a is equal to or larger than the first displacement amount and equal to or smaller than the maximum displacement amount, the displacement amount is in a range of not smaller than the displacement amount 4D and not larger than the displacement amount 5D.

FIG. 3 is a table illustrating driving efficiency of the actuator 1a in the states illustrated in FIG. 2. A change in temperature that is needed to generate displacement of ΔL in this actuator is 0.2ΔT in the first actuator fibers 2a and 2b and is ΔT in the second actuator fibers 3a, 3b, 3c, 3d, 3e, 3f, 3g, and 3h. Accordingly, the input energy in the state illustrated in FIG. 2(b) is only 0.2 J since it is only necessary to heat the first actuator fibers 2a and 2b. The input energy in the state illustrated in FIG. 2(c) is J since the first actuator fibers 2a and 2b and the second actuator fibers 3a, 3b, 3c, 3d, 3e, 3f, 3g, and 3h are heated. The driving efficiency calculated from this is 0.8η in the state illustrated in FIG. 2(b), which is five times as high as that in Comparative Example 1 under the same load. The driving efficiency is in the state illustrated in FIG. 2(c), which is equal to that in Comparative Example 1 under the same load.

Figure 4:
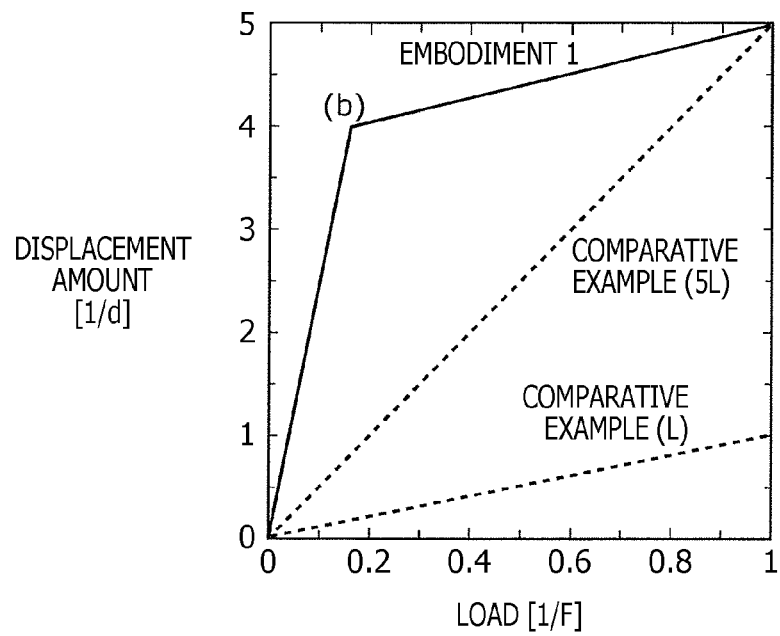
FIG. 4 is a diagram illustrating a relationship between load and a displacement amount in the actuator according to Embodiment 1.

FIG. 4 is a diagram illustrating a relationship between load and a displacement amount in the actuator 1a. In FIG. 4, Comparative Example (L) is a result of the comparative example illustrated in FIGS. 19 and 20 in which an actuator element has a natural length of L, and Comparative Example (5L) is a result of the comparative example illustrated in FIGS. 22 and 23 in which an actuator element has a natural length of 5L. In the comparative examples, a displacement amount increases in proportion to load. Meanwhile, the actuator 1a according to the present embodiment exhibits non-linear spring characteristics as illustrated in FIG. 4 since load is supported by the first actuator fibers 2a and 2b until the load becomes 0.16 F and is then supported by the first actuator fibers 2a and 2b and the second actuator fibers 3a, 3b, 3c, 3d, 3e, 3f, 3g, and 3h. The position indicated by (b) in FIG. 4 corresponds to the state indicated by (b) in FIGS. 2 and 3.

Figure 5:
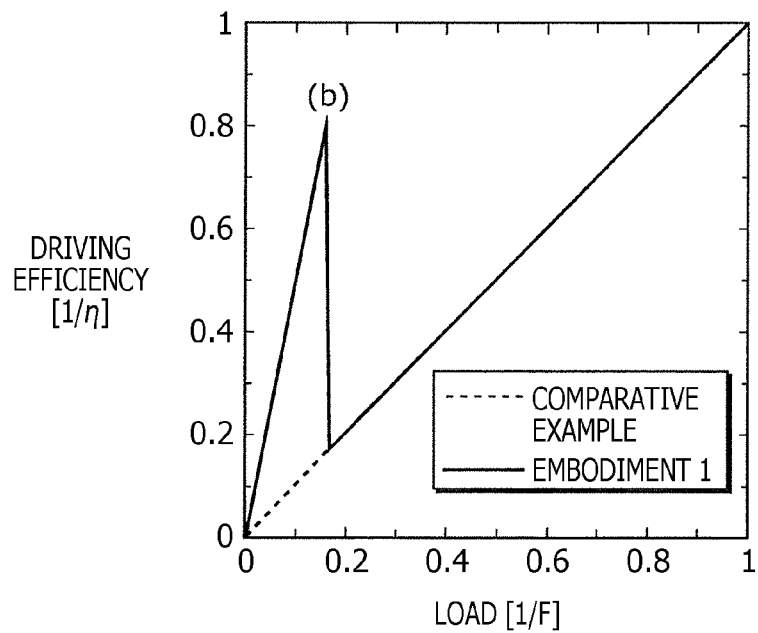
FIG. 5 is a diagram illustrating a relationship between load and driving efficiency in the actuator according to Embodiment 1.

FIG. 5 is a diagram illustrating a relationship between load and driving efficiency in the actuator 1a. As is clear from FIG. 5, the driving efficiency is higher than that in the comparative examples until the load becomes 0.16 F ((b) of FIG. 5). The characteristics illustrated in FIG. 5 are effective especially in a case where an actuator is normally driven under load of 0.16 F or smaller and is durable up to the load F that is larger than the normal load from the perspective of safety.

According to the present embodiment, the plate member 5a can be displaced by changing the temperature of the first actuator fibers 2a and 2b in a case where the load that acts on the plate member 5a is smaller than the allowable maximum load that can be supported by tension of both of the first actuator fibers 2a and 2b and the second actuator fibers 3a, 3b, 3c, 3d, 3e, 3f, 3g, and 3h and the load can be supported by tension of the first actuator fibers 2a and 2b. In this case, thermal energy can be made smaller by an amount needed to change the temperature of the second actuator fibers 3a, 3b, 3c, 3d, 3e, 3f, 3g, and 3h than that needed in a case where the load is supported by tension of both of the first actuator fibers 2a and 2b and the second actuator fibers 3a, 3b, 3c, 3d, 3e, 3f, 3g, and 3h. This allows the actuator 1a according to the present embodiment to have higher driving efficiency under low load than the actuators according to the comparative examples in which the driving efficiency is low under low load. It is therefore possible to obtain the actuator 1a that has improved driving efficiency under load that is lower than allowable maximum load.

In the present embodiment, since electricity is applied to the second actuator fibers 3a, 3b, 3c, 3d, 3e, 3f, 3g, and 3h when the plate member 5a is displaced and makes contact with the end members 10a, 10b, 10c, 10d, 10e, 10f, 10g, and 10h, the second actuator fibers 3a, 3b, 3c, 3d, 3e, 3f, 3g, and 3h are electrically heated and the temperature thereof is changed in a state where tension acts on the second actuator fibers 3a, 3b, 3c, 3d, 3e, 3f, 3g, and 3h. With this configuration, it is unnecessary to consume unnecessary energy by changing the temperature of the second actuator fibers 3a, 3b, 3c, 3d, 3e, 3f, 3g, and 3h in a case where load can be supported by the first actuator fibers 2a and 2b. This makes it possible to improve the driving efficiency. However, the present embodiment is not limited to this configuration. It is also possible to employ a configuration in which the connection members 9a, 9b, 9c, 9d, 9e, 9f, 9g, and 9h and the plate member 5a are connected to each other via switches that are turned on and off on the basis of tension that acts on the connection members 9a, 9b, 9c, 9d, 9e, 9f, 9g, and 9h or a configuration in which tension that acts on the second actuator fibers 3a, 3b, 3c, 3d, 3e, 3f, 3g, and 3h is measured by a strain sensor or the like and the controller 13a switches on and off the switch 15b on the basis of information thus obtained. Furthermore, it is also possible to employ a configuration in which the controller 13a switches on and off the switch 15b in a case where the plate member 5a is in a displacement range in which it is estimated that tension acts on the second actuator fibers 3a, 3b, 3c, 3d, 3e, 3f, 3g, and 3h instead of directly measuring the tension.

In the present embodiment, in a case where a displacement amount of the plate member 5a relative to the plate member 4a is equal to or larger than the first displacement amount and is equal to or smaller than the maximum displacement amount, displacement amounts are controlled by using the first controller 13a1 and the second controller 13a2 so that an amount obtained by subtracting the first displacement amount from a displacement amount of the first actuator unit 2 is equal to a displacement amount of the second actuator unit 3. Specifically, both of the first actuator fibers 2a and 2b and the second actuator fibers 3a, 3b, 3c, 3d, 3e, 3f, 3g, and 3h are displaced by ΔL when the temperature of the first actuator fibers 2a and 2b and the temperature of the second actuator fibers 3a, 3b, 3c, 3d, 3e, 3f, 3g, and 3h are changed. This makes it possible to minimize a variation in load between the first actuator fibers 2a and 2b and the second actuator fibers 3a, 3b, 3c, 3d, 3e, 3f, 3g, and 3h, thereby avoiding a problem such as shortening of lifetime of specific actuator fibers.

In the present embodiment, the first actuator unit 2 is constituted by the first actuator fibers 2a and 2b that are aligned in a line, and the second actuator unit 3 is constituted by the second actuator fibers 3a, 3b, 3c, 3d, 3e, 3f, 3g, and 3h that are aligned in a line. In such a case where load is held by a plurality of actuator fibers that are aligned in a line, each of the actuator fibers can be made thin, and therefore a thinner actuator 1a can be obtained. However, the present embodiment is not limited to this. The first actuator unit 2 or the second actuator unit 3 may be constituted by a single actuator fiber or may be constituted by a different number of actuator fibers that are aligned in a line. It can be assumed that a spring rate of a coil spring is proportional to the square of a dimeter of an actuator fiber (a diameter of a cross section taken along a direction perpendicular to a central axis of a high polymer fiber bundle) if the length is the same and the shape is similar. Therefore, for example, the first actuator unit 2 that is constituted by the two first actuator fibers 2a and 2b can be replaced with a single actuator fiber by making the diameter of the actuator fiber $\sqrt{2}$ times larger. Similarly, the second actuator unit 3 that is constituted by the eight second actuator fibers 3a, 3b, 3c, 3d, 3e, 3f, 3g, and 3h can be replaced with a single actuator fiber by making the diameter of the actuator fiber $2\sqrt{2}$ times larger. By thus changing the fiber diameter, the number of actuator fibers that constitute the first actuator unit 2 or the second actuator unit 3 can be freely changed.

In the present embodiment, the first actuator fibers 2a and 2b and the second actuator fibers 3a, 3b, 3c, 3d, 3e, 3f, 3g, and 3h are symmetrically aligned in a line. Specifically, the first actuator fibers 2a and 2b and the second actuator fibers 3a, 3b, 3c, 3d, 3e, 3f, 3g, and 3h are symmetrical with respect to an intermediate line between the two actuator fibers 3a and 3h disposed at ends of the line. With this configuration, no moment is generated in the plate member 5a when the plate member 5a is moved by using the first actuator fibers 2a and 2b or by using the first actuator fibers 2a and 2b and the second actuator fibers 3a, 3b, 3c, 3d, 3e, 3f, 3g, and 3h.

In the present embodiment, the first actuator fibers 2a and 2b and the second actuator fibers 3a, 3b, 3c, 3d, 3e, 3f, 3g, and 3h have the same spring shape but have different lengths. Specifically, the actuator 1a is configured such that each of the first actuator fibers 2a and 2b has a first spring shape including a first coil diameter, a first spring pitch, and a first wire diameter that is a wire diameter of the high polymer fiber bundles of the first actuator fibers 2a and 2b, and each of the second actuator fibers 3a, 3b, 3c, 3d, 3e, 3f, 3g, and 3h has a second spring shape including a second coil diameter that is equal to the first coil diameter, a second spring pitch that is equal to the first spring pitch, and a second wire diameter that is a wire diameter of the high polymer fiber bundles of the second actuator fibers 3a, 3b, 3c, 3d, 3e, 3f, 3g, and 3h and is equal to the first wire diameter. Furthermore, the actuator 1a is configured such that the length of the first actuator fibers 2a and 2b and the length of the second actuator fibers 3a, 3b, 3c, 3d, 3e, 3f, 3g, and 3h are different from each other. With this configuration, the actuator fibers that constitute the first actuator unit 2 and the second actuator unit 3 are equal to each other in terms of generated stress and allowable strain and spring rates of the actuator fibers are inversely proportional to the lengths thereof. Therefore, by adjusting the lengths and the number of actuator fibers, it is possible to easily set a ratio of the spring rate of the first actuator unit 2 and the spring rate of the second actuator unit 3 to a desired value. Furthermore, since the actuator 1a can be easily designed so that both of the first actuator unit 2 and the second actuator unit 3 can be strained to an allowable maximum degree under maximum load, all of the actuator fibers can be utilized to the fullest potential.

In the present embodiment, the actuator fibers are made of nylon. However, the material of the actuator fibers is not limited to this. The actuator fibers can be made of any of various high polymer materials such as polyethylene, PVDF, polyester, or Kevlar.

In the present embodiment, the temperature of the actuator fibers is changed by silver-plating surfaces of the actuator fibers and electrically heating the actuator fibers. This method is easy to handle. However, the present embodiment is not limited to this. The actuator fibers may be electrically heated by plating the surfaces with an electrically conductive material other than silver, by making the actuator fibers electrically conductive by blending an electrically conductive material in the high polymer material, or by winding an electrically conductive material around the actuator fibers.

Furthermore, the temperature of the actuator fibers may be changed, for example, by changing the temperature of gas around the actuator fibers or by changing the temperature of liquid that is in contact with the actuator fibers. In a case where the surfaces of the actuator fibers are made electrically conductive, the surfaces may be coated so as to be insulated in order to prevent electrical contact with an adjacent actuator fiber.

Note that the ratio of the spring rate of the first actuator fibers $2a$ and $2b$ and the spring rate of the second actuator fibers $3a$, $3b$, $3c$, $3d$, $3e$, $3f$, $3g$, and $3h$ in the present embodiment is merely an example, and under which load the driving efficiency reaches a maximum value indicated by (b) of FIG. 5 can be freely set in accordance with a situation in which the actuator $1a$ is used. In any cases, driving efficiency under load that is lower than allowable maximum load can be improved.

Embodiment 2

Configuration of Actuator

Figure 6:
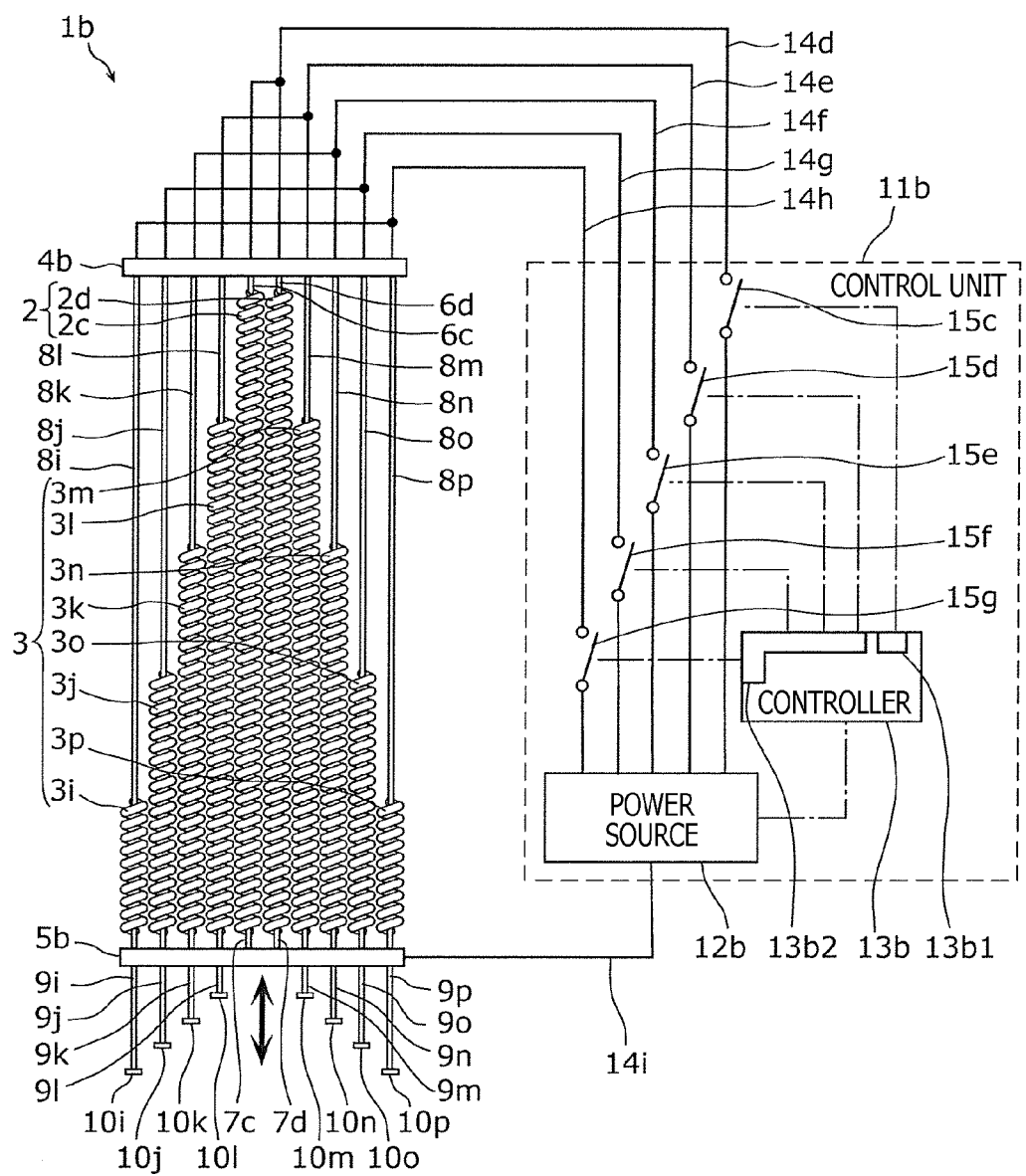
FIG. 6 is a diagram illustrating an outline of an actuator according to Embodiment 2.

FIG. 6 is a diagram illustrating an outline of an actuator $1b$ according to Embodiment 2.

The actuator $1b$ includes a first actuator unit 2 and a second actuator unit 3. The first actuator unit 2 and the second actuator unit 3 are located between a plate member $4b$, which is an example of a base, and a plate member $5b$, which is an example of a displacement member.

The first actuator unit 2 is constituted by two first actuator fibers $2c$ and $2d$ that are aligned in a line and have the same spring shape and the same length. The second actuator unit 3 is constituted by two second actuator fibers $3i$ and $3p$ that have the same spring shape as the first actuator fibers $2c$ and $2d$ and have a length that is one fifth of that of the first actuator fibers $2c$ and $2d$, two second actuator fibers $3j$ and $3o$ that have the same spring shape as the first actuator fibers $2c$ and $2d$ and have a length that is two fifths of that of the first actuator fibers $2c$ and $2d$, two second actuator fibers $3k$ and $3n$ that have the same spring shape as the first actuator fibers $2c$ and $2d$ and have a length that is three fifths of that of the first actuator fibers $2c$ and $2d$, and two second actuator fibers $3l$ and $3m$ that have the same spring shape as the first actuator fibers $2c$ and $2d$ and have a length that is four fifths of that of the first actuator fibers $2c$ and $2d$. The second actuator fibers $3i$ and $3p$, the second actuator fibers $3j$ and $3o$, the second actuator fibers $3k$ and $3n$, and the second actuator fibers $3l$ and $3m$ that constitute the second actuator unit 3 have different spring rates. Note that the expression "the same spring shape" means that the first actuator fibers $2c$ and $2d$ and the second actuator fibers $3i$, $3j$, $3k$, $3l$, $3m$, $3n$, $3o$, and $3p$ are the same in terms of coil diameter, spring pitch, and wire diameter of a high polymer fiber bundle that will be described later.

Since the second actuator fibers $3i$ and $3p$ have a length that is one fifth of that of the first actuator fibers $2c$ and $2d$, the spring rate of the second actuator fibers $3i$ and $3p$ is five times as high as that of the first actuator fibers $2c$ and $2d$. Since the second actuator fibers $3i$ and $3p$ have a length that is one fifth of that of the first actuator fibers $2c$ and $2d$, a maximum displacement amount of the second actuator fibers $3i$ and $3p$ is one fifth of that of the first actuator fibers $2c$ and $2d$ during use of the actuator $1b$. Similarly, the spring rates of the second actuator fibers $3j$ and $3o$, the second actuator fibers $3k$ and $3n$, and the second actuator fibers $3l$ and $3m$ are 2.5 times, 5/3 times, and 1.25 times as high as that of the first actuator fibers $2c$ and $2d$, respectively. Maximum displacement amounts of the second actuator fibers $3j$ and $3o$, the second actuator fibers $3k$ and $3n$, and the second actuator fibers $3l$ and $3m$ are 2/5 times, 3/5 times, and 4/5 times as large as that of the first actuator fibers $2c$ and $2d$.

Each of the first actuator fibers $2c$ and $2d$ and the second actuator fibers $3i$, $3j$, $3k$, $3l$, $3m$, $3n$, $3o$, and $3p$ has a coil-like structure in which a high polymer fiber bundle including one or more twisted high polymer fibers (e.g., nylon fibers) is wound spirally. Surfaces of the first actuator fibers $2c$ and $2d$ and the second actuator fibers $3i$, $3j$, $3k$, $3l$, $3m$, $3n$, $3o$, and $3p$ are silver-plated. The first actuator fibers $2c$ and $2d$ and the second actuator fibers $3i$, $3j$, $3k$, $3l$, $3m$, $3n$, $3o$, and $3p$ are resistively-heated (electrically heated) upon application of electricity and stretch or contract in accordance with a change in temperature caused by the electric heating. In the present embodiment, a direction of twisting of the high polymer fiber bundle and a direction of winding of the spiral are the same as each other, and the entire length of each of the first actuator fibers $2c$ and $2d$ and the second actuator fibers $3i$, $3j$, $3k$, $3l$, $3m$, $3n$, $3o$, and $3p$ contracts upon application of heat.

One ends of the first actuator fibers $2c$ and $2d$ are connected to the plate member $4b$ via connection members $6c$ and $6d$, respectively. Similarly, one ends of the second actuator fibers $3i$, $3j$, $3k$, $3l$, $3m$, $3n$, $3o$, and $3p$ are connected to the plate member $4b$ via connection members $8i$, $8j$, $8k$, $8l$, $8m$, $8n$, $8o$, and $8p$, respectively.

The other ends of the first actuator fibers $2c$ and $2d$ are connected to the plate member $5b$ via connection members $7c$ and $7d$, respectively. One ends of connection members $9i$, $9j$, $9k$, $9l$, $9m$, $9n$, $9o$, and $9p$ are connected to the other ends of the second actuator fibers $3i$, $3j$, $3k$, $3l$, $3m$, $3n$, $3o$, and $3p$, respectively.

Each of the connection members $6c$ and $6d$, the connection members $7c$ and $7d$, the connection members $8i$, $8j$, $8k$, $8l$, $8m$, $8n$, $8o$, and $8p$, and the connection members $9i$, $9j$, $9k$, $9l$, $9m$, $9n$, $9o$, and $9p$ is, for example, made of a linear material. According to this arrangement, the actuator $1b$ can be given flexibility against bending. The material can be high polymer fibers, carbon fibers, a metal wire, or the like. The high polymer fibers and the carbon fibers are light in weight. The metal wire may be a material, such as a superelastic alloy, having flexibility against bending.

Through-holes pass through the plate member $5b$ in a top-to-bottom direction of FIG. 6, and the connection members $9i$, $9j$, $9k$, $9l$, $9m$, $9n$, $9o$, and $9p$ are inserted into the through-holes. The plate member $5b$ is slidable in the top-to-bottom direction relative to the connection members $9i$, $9j$, $9k$, $9l$, $9m$, $9n$, $9o$, and $9p$. End members $10i$, $10j$, $10k$, $10l$, $10m$, $10n$, $10o$, and $10p$ having electric conductivity are connected to the other ends of the connection members $9i$, $9j$, $9k$, $9l$, $9m$, $9n$, $9o$, and $9p$, respectively. When the plate member $5b$ connected to the first actuator fibers $2c$ and $2d$ moves in the downward direction of FIG. 6 and sequentially makes contact with the end members $10l$ and $10m$, end members $10k$ and $10n$, end members $10j$ and $10o$, and end members $10i$ and $10p$, tension acts on the second actuator fibers $3l$ and $3m$ via the connection members $9l$ and $9m$, on the second actuator fibers $3k$ and $3n$ via the connection members $9k$ and $9n$, on the second actuator fibers $3j$ and $3o$ via the connection members $9j$ and $9o$, and on the second actuator fibers $3i$ and $3p$ via the connection members $9i$ and $9p$.

The actuator $1b$ is driven by a control unit $11b$. More specifically, the control unit $11b$ includes a power source $12b$, a controller $13b$ (including a first controller $13b1$ and a second controller $13b2$), and switches $15c$, $15d$, $15e$, $15f$, and $15g$. The first controller $13b1$ switches a connection state between a wire 14*d* and the power source 12*b* by switching on and off the switch 15*c* and thus control electricity application to the first actuator fibers 2*c* and 2*d*. The second controller 13*b*2 switches connection states between wires 14*e*, 14*f*, 14*g*, and 14*h* and the power source 12*b* by switching on and off the switches 15*d*, 15*e*, 15*f*, and 15*g* and thus control electricity application to the second actuator fibers 3*i*, 3*j*, 3*k*, 3*l*, 3*m*, 3*n*, 3*o*, and 3*p*. The wire 14*d* is electrically connected to the first actuator fibers 2*c* and 2*d* via a first electrode unit provided on the plate member 4*b* and via the connection members 6*c* and 6*d*. The wire 14*e* is electrically connected to the second actuator fibers 3*l* and 3*m* via a second electrode unit provided on the plate member 4*b* and via the connection members 8*l* and 8*m*. The wire 14*f* is electrically connected to the second actuator fibers 3*k* and 3*n* via a third electrode unit provided on the plate member 4*b* and via the connection members 8*k* and 8*n*. The wire 14*g* is electrically connected to the second actuator fibers 3*j* and 3*o* via a fourth electrode unit provided on the plate member 4*b* and via the connection members 8*j* and 8*o*. The wire 14*h* is electrically connected to the second actuator fibers 3*i* and 3*p* via a fifth electrode unit provided on the plate member 4*b* and via the connection members 8*i* and 8*p*. The plate member 4*b* is configured so that the first electrode unit, the second electrode unit, the third electrode unit, the fourth electrode unit, and the fifth electrode unit are not electrically conductive with each other. A voltage converter (not illustrated) is provided between the power source 12*b* and each of the switches 15*c*, 15*d*, 15*e*, 15*f*, and 15*g*. These voltage converters make voltages applied to the first actuator fibers 2*c* and 2*d* and the second actuator fibers 3*i*, 3*j*, 3*k*, 3*l*, 3*m*, 3*n*, 3*o*, and 3*p* different from each other.

In a case where the connection members 6*c* and 6*d* and the connection members 8*i*, 8*j*, 8*k*, 8*l*, 8*m*, 8*n*, 8*o*, and 8*p* are made of an electrically conductive material, the connection members 6*c* and 6*d* and the connection members 8*i*, 8*j*, 8*k*, 8*l*, 8*m*, 8*n*, 8*o*, and 8*p* can be used as wires as they are. In a case where the connection members 6*c* and 6*d* and the connection members 8*i*, 8*j*, 8*k*, 8*l*, 8*m*, 8*n*, 8*o*, and 8*p* are made of a material that is not electrically conductive, electrical connection between the wire 14*d* and the first actuator fibers 2*c* and 2*d*, electrical connection between the wire 14*e* and the second actuator fibers 3*l* and 3*m*, electrical connection between the wire 14*f* and the second actuator fibers 3*k* and 3*n*, electrical connection between the wire 14*g* and the second actuator fibers 3*j* and 3*o*, and electrical connection between the wire 14*h* and the second actuator fibers 3*i* and 3*p* may be secured, for example, by metal-plating surfaces of the connection members 6*c* and 6*d* and the connection members 8*i*, 8*j*, 8*k*, 8*l*, 8*m*, 8*n*, 8*o*, and 8*p* or forming an electrically conductive material on the surfaces. Although in the present embodiment, the power source 12*b* and the first actuator fibers 2*c* and 2*d* or the second actuator fibers 3*i*, 3*j*, 3*k*, 3*l*, 3*m*, 3*n*, 3*o*, and 3*p* are electrically connected to each other via the plate member 4*b*, the connection members 6*c* and 6*d*, and the connection members 8*i*, 8*j*, 8*k*, 8*l*, 8*m*, 8*n*, 8*o*, and 8*p*, the present embodiment is not limited to this. Each of the first actuator fibers 2*c* and 2*d* and the second actuator fibers 3*i*, 3*j*, 3*k*, 3*l*, 3*m*, 3*n*, 3*o*, and 3*p* may be directly connected to a corresponding one of the wires 14*d*, 14*e*, 14*f*, 14*g*, and 14*h*.

Furthermore, a wire 14*i* is connected to the power source 12*b*. The wire 14*i* is connected to the plate member 5*b*. A sixth electrode unit, a seventh electrode unit, an eighth electrode unit, a ninth electrode unit, and a tenth electrode unit, which are a plurality of electrode units, are provided on a lower surface (surface on the lower side in FIG. 6) of the plate member 5*b* so as not to be electrically conductive with each other. The sixth electrode unit is provided on the lower surface of the plate member 5*b* at a position corresponding to the first actuator fibers 2*c* and 2*d*, the seventh electrode unit is provided on the lower surface of the plate member 5*b* at a position corresponding to the second actuator fibers 3*l* and 3*m*, the eighth electrode unit is provided on the lower surface of the plate member 5*b* at a position corresponding to the second actuator fibers 3*k* and 3*n*, the ninth electrode unit is provided on the lower surface of the plate member 5*b* at a position corresponding to the second actuator fibers 3*j* and 3*o*, and the tenth electrode unit is provided on the lower surface of the plate member 5*b* at a position corresponding to the second actuator fibers 3*i* and 3*p*.

The wire 14*i* and the first actuator fibers 2*c* and 2*d* are always electrically connected to each other. In this actuator 1*b*, the wire 14*i* and the second actuator fibers 3*l* and 3*m* are electrically connected to each other in a case where the end members 10*l* and 10*m* make contact with the seventh electrode unit; the wire 14*i* and the second actuator fibers 3*k* and 3*n* are electrically connected to each other in a case where the end members 10*k* and 10*n* make contact with the eighth electrode unit; the wire 14*i* and the second actuator fibers 3*j* and 3*o* are electrically connected to each other in a case where the end members 10*j* and 10*o* make contact with the ninth electrode unit; and the wire 14*i* and the second actuator fibers 3*i* and 3*p* are electrically connected to each other in a case where the end members 10*i* and 10*p* make contact with the tenth electrode unit. That is, the wire 14*i* is electrically connected to the first actuator fibers 2*c* and 2*d* via the sixth electrode unit and the connection members 7*c* and 7*d*, is electrically connected to the second actuator fibers 3*l* and 3*m* via the seventh electrode unit, the end members 10*l* and 10*m*, and the connection members 9*l* and 9*m*, is electrically connected to the second actuator fibers 3*k* and 3*n* via the eighth electrode unit, the end members 10*k* and 10*n*, and the connection members 9*k* and 9*n*, is electrically connected to the second actuator fibers 3*j* and 3*o* via the ninth electrode unit, the end members 10*j* and 10*o*, and the connection members 9*j* and 9*o*, and is electrically connected to the second actuator fibers 3*i* and 3*p* via the tenth electrode unit, the end members 10*i* and 10*p*, and the connection members 9*i* and 9*p*.

In a case where the connection members 7*c* and 7*d* and the connection members 9*i*, 9*j*, 9*k*, 9*l*, 9*m*, 9*n*, 9*o*, and 9*p* are made of an electrically conductive material, the connection members 7*c* and 7*d* and the connection members 9*i*, 9*j*, 9*k*, 9*l*, 9*m*, 9*n*, 9*o*, and 9*p* can be used as wires as they are. In a case where the connection members 7*c* and 7*d* and the connection members 9*i*, 9*j*, 9*k*, 9*l*, 9*m*, 9*n*, 9*o*, and 9*p* are made of a material that is not electrically conductive, electrical connection between the wire 14*i* and the first actuator fibers 2*c* and 2*d*, electrical connection between the wire 14*i* and the second actuator fibers 3*l* and 3*m*, electrical connection between the wire 14*i* and the second actuator fibers 3*k* and 3*n*, electrical connection between the wire 14*i* and the second actuator fibers 3*j* and 3*o*, and electrical connection between the wire 14*i* and the second actuator fibers 3*i* and 3*p* may be secured, for example, by metal-plating surfaces of the connection members 7*c* and 7*d* and the connection members 9*i*, 9*j*, 9*k*, 9*l*, 9*m*, 9*n*, 9*o*, and 9*p* or forming an electrically conductive material on the surfaces. An insulation process is performed between the connection members 9*i*, 9*j*, 9*k*, 9*l*, 9*m*, 9*n*, 9*o*, and 9*p* and the plate member 5*b* (e.g., in the through-holes of the plate member 5*b*) so that the connection members 9*i*, 9*j*, 9*k*, 9*l*, 9*m*, 9*n*, 9*o*, and 9p are not electrically connected to the wire 14i without the end members 10i, 10j, 10k, 10l, 10m, 10n, 10o, and 10p.

Next, operation of the actuator 1b is described.

In the actuator 1b illustrated in FIG. 6, the plate member 4b is fixed, and the plate member 5b is configured to be freely movable in the top-bottom direction of FIG. 6 in a state where load is applied in the downward direction of FIG. 6. In a case where the load is small, the load is supported by the first actuator fibers 2c and 2d, and the plate member 5b and the end members 10i, 10j, 10k, 10l, 10m, 10n, 10o, and 10p do not make contact with each other. When the load becomes higher, the load cannot be supported by the first actuator fibers 2c and 2d, and the plate member 5b and the end members 10l and 10m make contact with each other. As a result, the load is supported by the first actuator fibers 2c and 2d and the second actuator fibers 3l and 3m. When the load further becomes higher, the plate member 5b sequentially makes contact with the end members 10k and 10n, the end members 10j and 10o, and the end members 10i and 10p. In this way, the second actuator fibers 3k and 3n, the second actuator fibers 3j and 3o, and the second actuator fibers 3i and 3p are sequentially added as actuator fibers that support the load.

In the present embodiment, an amount by which the plate member 5b is displaced relative to the plate member 4b when the load is maximum is referred to as a maximum displacement amount. An amount by which the plate member 5b is displaced relative to the plate member 4b when the end members 10l and 10m make contact with or are separated from the plate member 5b is referred to as a first displacement amount, an amount by which the plate member 5b is displaced relative to the plate member 4b when the end members 10k and 10n make contact with or are separated from the plate member 5b is referred to as a second displacement amount, an amount by which the plate member 5b is displaced relative to the plate member 4b when the end members 10j and 10o make contact with or are separated from the plate member 5b is referred to as a third displacement amount, and an amount by which the plate member 5b is displaced relative to the plate member 4b when the end members 10i and 10p make contact with or are separated from the plate member 5b is referred to as a fourth displacement amount.

However, in a case where the second actuator fibers 3l and 3m are not present, an amount by which the plate member 5b is displaced relative to the plate member 4b when the end members 10k and 10n make contact with or are separated from the plate member 5b may be referred to as a first displacement amount, an amount by which the plate member 5b is displaced relative to the plate member 4b when the end members 10j and 10o make contact with or are separated from the plate member 5b may be referred to as a second displacement amount, and an amount by which the plate member 5b is displaced relative to the plate member 4b when the end members 10i and 10p make contact with or are separated from the plate member 5b may be referred to as a third displacement amount. Furthermore, in a case where the second actuator fibers 3k and 3n are not present either, an amount by which the plate member 5b is displaced relative to the plate member 4b when the end members 10j and 10o make contact with or are separated from the plate member 5b may be referred to as a first displacement amount, and an amount by which the plate member 5b is displaced relative to the plate member 4b when the end members 10i and 10p make contact with or are separated from the plate member 5b may be referred to as a second displacement amount. Furthermore, in a case where the second actuator fibers 3j and 3o are not present either, an amount by which the plate member 5b is displaced relative to the plate member 4b when the end members 10i and 10p make contact with or are separated from the plate member 5b may be referred to as a first displacement amount.

In a case where the actuator 1b is in operation, the controller 13b of the control unit 11b short-circuits or open-circuits the switches 15c, 15d, 15e, 15f, and 15g. In a case where the displacement amount of the plate member 5b relative to the plate member 4b is smaller than the first displacement amount, the first actuator fibers 2c and 2d are electrically heated, and contracting force is generated upward (in the upward direction of FIG. 6) in the first actuator fibers 2c and 2d. In a case where the displacement amount of the plate member 5b relative to the plate member 4b is equal to or larger than the first displacement amount and smaller than the second displacement amount, the first actuator fibers 2c and 2d and the second actuator fibers 3l and 3m are electrically heated, and contracting force is generated upward in the first actuator fibers 2c and 2d and the second actuator fibers 3l and 3m. In a case where the displacement amount of the plate member 5b relative to the plate member 4b is equal to or larger than the second displacement amount and smaller than the third displacement amount, the first actuator fibers 2c and 2d and the second actuator fibers 3k, 3l, 3m, and 3n are electrically heated, and contracting force is generated upward in the first actuator fibers 2c and 2d and the second actuator fibers 3k, 3l, 3m, and 3n. In a case where the displacement amount of the plate member 5b relative to the plate member 4b is equal to or larger than the third displacement amount and smaller than the fourth displacement amount, the first actuator fibers 2c and 2d and the second actuator fibers 3j, 3k, 3l, 3m, 3n, and 3o are electrically heated, and contracting force is generated upward in the first actuator fibers 2c and 2d and the second actuator fibers 3j, 3k, 3l, 3m, 3n, and 3o. In a case where the displacement amount of the plate member 5b relative to the plate member 4b is equal to or larger than the fourth displacement amount and equal to or smaller than the maximum displacement amount, all of the first actuator fibers 2c and 2d and the second actuator fibers 3i, 3j, 3k, 3l, 3m, 3n, 3o, and 3p are electrically heated, and contracting force is generated upward in all of the actuator fibers.

In the actuator 1b according to the present embodiment, in a case where the displacement amount of the plate member 5b relative to the plate member 4b is smaller than the first displacement amount, the temperature of the first actuator fibers 2a and 2b is controlled by application of electricity to the first actuator fibers 2c and 2d and the temperature of the second actuator fibers 3i, 3j, 3k, 3l, 3m, 3n, 3o, and 3p is not controlled, so that load is held by the first actuator unit 2. Meanwhile, in a case where the displacement amount of the plate member 5b relative to the plate member 4b is equal to or larger than the first displacement amount and is equal to or smaller than the maximum displacement amount, the temperature of the first actuator fibers 2c and 2d is controlled by application of electricity to the first actuator fibers 2c and 2d and the temperature of the second actuator fibers 3i, 3j, 3k, 3l, 3m, 3n, 3o, and 3p is controlled by application of electricity to the second actuator fibers 3l and 3m, the second actuator fibers 3k, 3l, 3m, and 3n, the second actuator fibers 3j, 3k, 3l, 3m, 3n, and 3o, or the second actuator fibers 3i, 3j, 3k, 3l, 3m, 3n, 3o, and 3p, so that the load is held by both of the first actuator unit 2 and the second actuator unit 3.

Effects of Actuator

Figure 7:
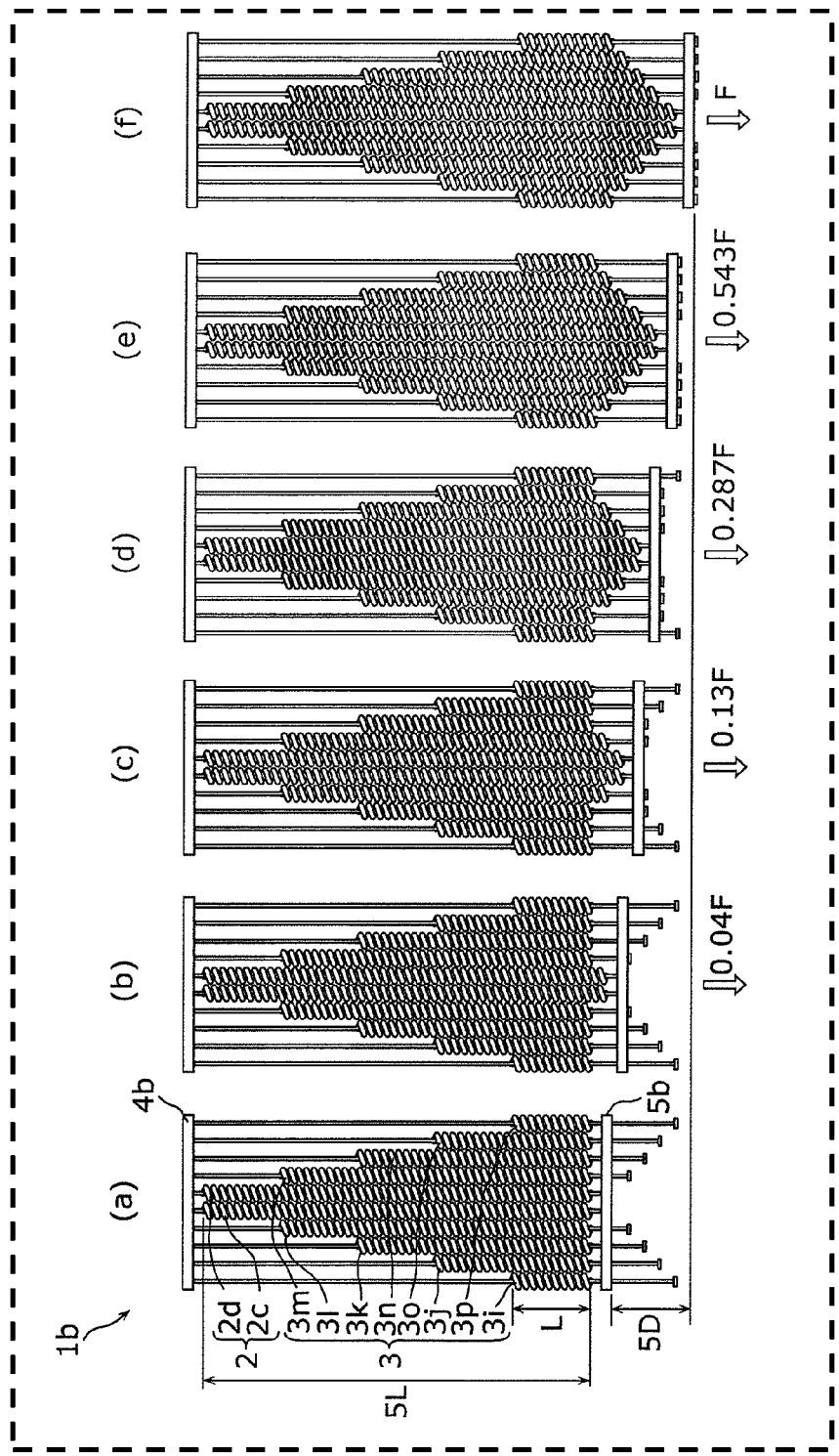
FIG. 7 is a diagram illustrating an outline of a case where various loads are applied to the actuator according to Embodiment 2.

FIG. 7 is a diagram illustrating an outline of a case where various loads are applied to the actuator 1b according to Embodiment 2. In the actuator 1b, a natural length of the first actuator fibers 2c and 2d is 5L, a natural length of the second actuator fibers 3l and 3m is 4L, a natural length of the second actuator fibers 3k and 3n is 3L, a natural length of the second actuator fibers 3j and 3o is 2L, and a natural length of the second actuator fibers 3i and 3p is L. When the plate member 5b is displaced by D relative to the plate member 4b (when a displacement amount is D), the end members 10l and 10m and the plate member 5b make contact with each other. When the plate member 5b is displaced by 2D relative to the plate member 4b, the end members 10k and 10n and the plate member 5b further make contact with each other. When the plate member 5b is displaced by 3D relative to the plate member 4b, the end members 10j and 10o and the plate member 5b further make contact with each other. When the plate member 5b is displaced by 4D relative to the plate member 4b, the end members 10i and 10p and the plate member 5b further make contact with each other. Note that it is assumed that values of L, D, F, T, J, and used for description of the present embodiment are identical to those in Comparative Example 1.

FIG. 7(a) illustrates a state where no load is applied to the plate member 5b and the first actuator fibers 2c and 2d and the second actuator fibers 3i, 3j, 3k, 3l, 3m, 3n, 3o, and 3p have a natural length. FIG. 7(b) illustrates a state where the plate member 5b is displaced by D relative to the plate member 4b and the plate member 5b and the end members 10l and 10m are about to make contact with each other. In this state, the load is equal to load that achieve the state illustrated in FIG. 22(b) with the use of the first actuator fibers 2c and 2d whose number is one fifth of that in FIG. 22(b) and is therefore 0.04 F. FIG. 7(c) illustrates a state where the plate member 5b is displaced by 2D relative to the plate member 4b and the plate member 5b and the end members 10k and 10n are about to make contact with each other. In this state, the load is 0.13 F. FIG. 7(d) illustrates a state where the plate member 5b is displaced by 3D relative to the plate member 4b and the plate member 5b and the end members 10j and 10o are about to make contact with each other. In this state, the load is 0.287 F. FIG. 7(e) illustrates a state where the plate member 5b is displaced by 4D relative to the plate member 4b and the plate member 5b and the end members 10i and 10p are about to make contact with each other. In this state, the load is 0.543 F. FIG. 7(e) illustrates a state where the plate member 5b is displaced by 5D relative to the plate member 4b and the plate member 5b and the end members 10i, 10j, 10k, 10l, 10m, 10n, 10o, and 10p are in contact with each other. In this state, the load is F. In this state, the first actuator fibers 2c and 2d having a natural length of 5L are displaced by 5D, the second actuator fibers 3l and 3m having a natural length of 4L are displaced by 4D, the second actuator fibers 3k and 3n having a natural length of 3L are displaced by 3D, the second actuator fibers 3j and 3o having a natural length of 2L are displaced by 2D, and the second actuator fibers 3i and 3p having a natural length of L are displaced by D, and strain and tension are equal to each other in all of the actuator fibers.

Note that the load in each state is equal to the sum of values obtained by multiplying a spring rate and a displacement amount of each actuator fiber on which tension is acting. In the present embodiment, the first displacement amount of the plate member 5b relative to the plate member 4b is a displacement amount D, the second displacement amount of the plate member 5b relative to the plate member 4b is a displacement amount 2D, the third displacement amount of the plate member 5b relative to the plate member 4b is a displacement amount 3D, the fourth displacement amount of the plate member 5b relative to the plate member 4b is a displacement amount 4D, and the maximum displacement amount of the plate member 5b relative to the plate member 4b is a displacement amount 5D.

FIG. 8 is a table illustrating driving efficiency of the actuator 1b in the states illustrated in FIG. 7. A change in temperature that is needed to generate displacement of $\Delta L$ in this actuator is $0.2\Delta T$ in the first actuator fibers 2c and 2d, $0.25\Delta T$ in the second actuator fibers 3l and 3m, $0.333\Delta T$ in the second actuator fibers 3k and 3n, $0.5\Delta T$ in the second actuator fibers 3j and 3o, and $\Delta T$ in the second actuator fibers 3i and 3p. Accordingly, the input energy in the state illustrated in FIG. 7(b) is only 0.2 J since it is only necessary to heat the first actuator fibers 2c and 2d. The input energy in the state illustrated in FIG. 7(c) is only 0.4 J since it is only necessary to heat the first actuator fibers 2c and 2d and the second actuator fibers 3l and 3m. The input energy in the state illustrated in FIG. 7(d) is only 0.6 J since it is only necessary to heat the first actuator fibers 2c and 2d and the second actuator fibers 3k, 3l, 3m, and 3n. The input energy in the state illustrated in FIG. 7(e) is only 0.8 J since it is only necessary to heat the first actuator fibers 2c and 2d and the second actuator fibers 3j, 3k, 3l, 3m, 3n, and 3o. The input energy in the state illustrated in FIG. 7(f) is J since each of the first actuator fibers 2c and 2d and the second actuator fibers 3i, 3j, 3k, 3l, 3m, 3n, 3o, and 3p is heated. The driving efficiency calculated from this is $0.2\eta$ in the state illustrated in FIG. 7(b), which is five times as high as that in the comparative examples under the same load. The driving efficiency is $0.325\eta$ in the state illustrated in FIG. 7(c), which is 2.5 times as high as that in the comparative examples under the same load. The driving efficiency is $0.478\eta$ in the state illustrated in FIG. 7(d), which is 1.67 times as high as that in the comparative examples under the same load. The driving efficiency is $0.679\eta$ in the state illustrated in FIG. 7(e), which is 1.25 times as high as that in the comparative examples under the same load. The driving efficiency is in the state illustrated in FIG. 7(f), which is equal to that in the comparative examples under the same load.

Figure 9:
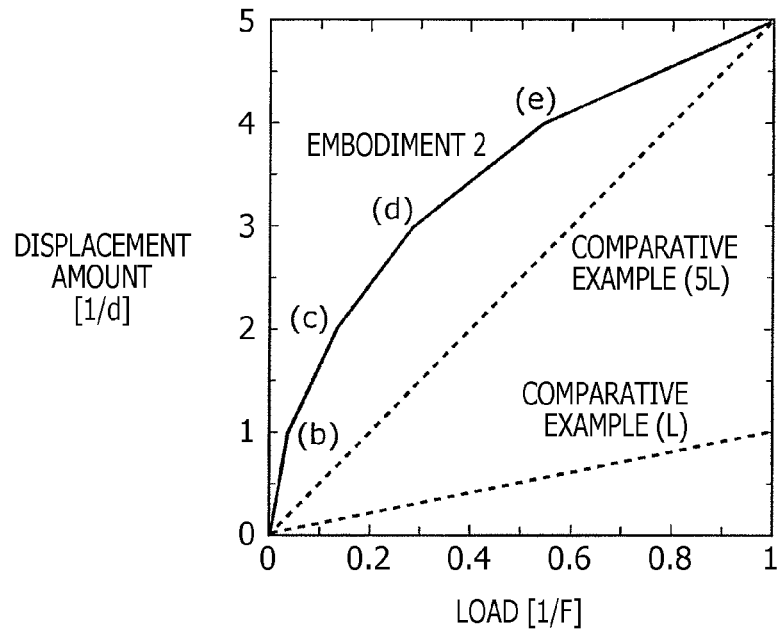
FIG. 9 is a diagram illustrating a relationship between load and a displacement amount in the actuator according to Embodiment 2.
Figure 10:
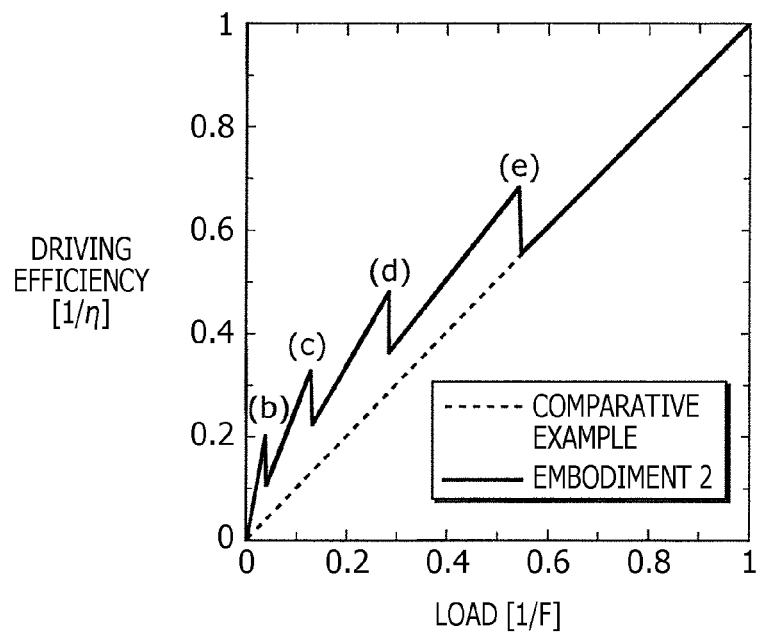
FIG. 10 is a diagram illustrating a relationship between load and driving efficiency in the actuator according to Embodiment 2.

FIG. 9 is a diagram illustrating a relationship between load and a displacement amount in the actuator 1b. In FIG. 9, Comparative Example (L) is a result of the comparative example illustrated in FIGS. 19 and 20 in which an actuator element has a natural length of L, and Comparative Example (5L) is a result of the comparative example illustrated in FIGS. 22 and 23 in which an actuator element has a natural length of 5L. In each of the comparative examples, a displacement amount has linear spring characteristics, i.e., increases in proportion to load. Meanwhile, the actuator 1b according to the present embodiment exhibits non-linear spring characteristics, i.e., the spring rate increases as the number of actuator fibers that support the load increases. The positions indicated by (b), (c), (d), and (e) in FIG. 9 correspond to the states indicated by (b), (c), (d), and (e) in FIGS. 7 and 8. FIG. 10 is a diagram illustrating a relationship between load and driving efficiency. As is clear from FIG. 10, the driving efficiency is higher than that in the comparative examples until the load becomes 0.543 F ((e) in FIG. 10). Such characteristics are effective especially in a case where an actuator need be durable up to the load F from the perspective of safety and the load normally fluctuates at a low level.

According to the present embodiment, the plate member 5b can be displaced by changing the temperature of the first actuator fibers 2c and 2d in a case where load that acts on the plate member 5b is smaller than allowable maximum load that can be held by tension of both of the first actuator fibers 2c and 2d and the second actuator fibers 3i, 3j, 3k, 3l, 3m, 3n, 3o, and 3p and the load can be held by tension of the first actuator fibers 2c and 2d. In this case, thermal energy can be made smaller by an amount needed to change the temperature of the second actuator fibers 3i, 3j, 3k, 3l, 3m, 3n, 3o, and 3p than that needed in a case where load is supported by tension of both of the first actuator fibers 2c and 2d and the second actuator fibers 3i, 3j, 3k, 3l, 3m, 3n, 3o, and 3p. This allows the actuator 1b according to the present embodiment to have higher driving efficiency under low load than that in the actuators of the comparative examples in which the driving efficiency is low under low load. It is therefore possible to obtain the actuator 1b that has improved driving efficiency under load that is lower than allowable maximum load.

Furthermore, according to the present embodiment, since a plurality of second actuator fibers that have different spring rates are provided, the plate member 5b can be displaced by changing the temperature of the first actuator fibers 2c and 2d and the second actuator fibers 3j, 3k, 3l, 3m, 3n, and 3o, for example, in a case where load that acts on the plate member 5b can be held by tension of the first actuator fibers 2c and 2d and the second actuator fibers 3j, 3k, 3l, 3m, 3n, and 3o. In this case, thermal energy can be made smaller by an amount needed to change the temperature of the second actuator fibers 3i and 3p than that needed in a case where load is supported by tension of both of the first actuator fibers 2c and 2d and the second actuator fibers 3i, 3j, 3k, 3l, 3m, 3n, 3o, and 3p. This makes it possible to improve driving efficiency under low load. In the case where a plurality of second actuator fibers having spring rates are provided, peaks of driving efficiency can be generated at a plurality of loads as illustrated in FIG. 10. It is therefore possible to increase the freedom of design.

In the present embodiment, since electricity can be applied to the second actuator fibers 3i, 3j, 3k, 3l, 3m, 3n, 3o, and 3p when the plate member 5b is displaced and makes contact with the end members 10i, 10j, 10k, 10l, 10m, 10n, 10o, and 10p, the second actuator fibers 3i, 3j, 3k, 3l, 3m, 3n, 3o, and 3p are electrically heated and the temperature thereof is changed in a state where tension is acting on the second actuator fibers 3i, 3j, 3k, 3l, 3m, 3n, 3o, and 3p. With this configuration, it is unnecessary to consume unnecessary energy by changing the temperature of the second actuator fibers 3i, 3j, 3k, 3l, 3m, 3n, 3o, and 3p in a case where load can be supported by the first actuator fibers 2c and 2d. This makes it possible to improve the driving efficiency. However, the present embodiment is not limited to this configuration. It is also possible to employ a configuration in which the connection members 9i, 9j, 9k, 9l, 9m, 9n, 9o, and 9p and the plate member 5b are connected to each other via switches that are turned on and off on the basis of tension that acts on the connection members 9i, 9j, 9k, 9l, 9m, 9n, 9o, and 9p or a configuration in which tension that acts on the second actuator fibers 3i, 3j, 3k, 3l, 3m, 3n, 3o, and 3p is measured by a strain sensor or the like and the controller 13b switches on and off the switches 15d, 15e, 15f, and 15g on the basis of information thus obtained. Furthermore, it is also possible to employ a configuration in which the controller 13b switches on and off the switches 15d, 15e, 15f, and 15g in a case where the plate member 5b is in a displacement range in which it is estimated that tension acts on the second actuator fibers 3i, 3j, 3k, 3l, 3m, 3n, 3o, and 3p instead of directly measuring the tension.

In the present embodiment, in a case where a displacement amount of the plate member 5b relative to the plate member 4b is equal to or larger than the first displacement amount and is equal to or smaller than the second displacement amount, displacement amounts are controlled by using the first controller 13b1 and the second controller 13b2 so that an amount obtained by subtracting the first displacement amount from a displacement amount of the first actuator unit 2 is equal to a displacement amount of a driven part of the second actuator unit 3. Furthermore, in a case where the relative position is equal to or larger than the second displacement amount and is equal to or smaller than the third displacement amount, displacement amounts are controlled by using the first controller 13b1 and the second controller 13b2 so that an amount obtained by subtracting the second displacement amount from the displacement amount of the first actuator unit 2 is equal to a displacement amount of a driven part of the second actuator unit 3. Furthermore, in a case where the relative position is equal to or larger than the third displacement amount and is equal to or smaller than the fourth displacement amount, displacement amounts are controlled by using the first controller 13b1 and the second controller 13b2 so that an amount obtained by subtracting the third displacement amount from the displacement amount of the first actuator unit 2 is equal to a displacement amount of a driven part of the second actuator unit 3. Furthermore, in a case where the relative position is equal to or larger than the fourth displacement amount and is equal to or smaller than the maximum displacement amount, displacement amounts are controlled by using the first controller 13b1 and the second controller 13b2 so that an amount obtained by subtracting the fourth displacement amount from the displacement amount of the first actuator unit 2 is equal to a displacement amount of a driven part of the second actuator unit 3. This is achieved by changing the temperature of the first actuator fibers 2c and 2d and the temperature of the second actuator fibers 3i, 3j, 3k, 3l, 3m, 3n, 3o, and 3p so that each of the first actuator fibers 2c and 2d and the second actuator fibers 3i, 3j, 3k, 3l, 3m, 3n, 3o, and 3p is displaced by $\Delta L$. According to this configuration, it is possible to minimize a variation in load between the first actuator fibers 2c and 2d and the second actuator fibers 3i, 3j, 3k, 3l, 3m, 3n, 3o, and 3p, thereby avoiding a problem such as shortening of lifetime of specific actuator fibers.

In the present embodiment, the first actuator unit 2 is constituted by the first actuator fibers 2c and 2d that are aligned in a line, and the second actuator unit 3 is constituted by the second actuator fibers 3l and 3m, the second actuator fibers 3k and 3n, the second actuator fibers 3j and 3o, and the second actuator fibers 3i and 3p that are aligned in a line. In such a case where load is supported by a plurality of actuator fibers that are aligned in a line, each of the actuator fibers can be made thin, and therefore a thinner actuator 1b can be obtained. However, the present embodiment is not limited to this. The first actuator unit 2 or the second actuator unit 3 may be constituted by a single actuator fiber or may be constituted by a different number of actuator fibers that are aligned in a line. It can be assumed that a spring rate of a coil spring is proportional to the square of a dimeter of an actuator fiber (a diameter of a cross section taken along a direction perpendicular to a central axis of a high polymer fiber bundle) if the length is the same and the shape is similar. Therefore, for example, the first actuator unit 2 that is constituted by the two first actuator fibers 2c and 2d can be replaced with a single actuator fiber by making the diameter of the actuator fiber √2 times larger. Similarly, the second actuator unit 3 can be replaced with a single actuator fiber by making the diameter of the actuator fiber √2 times larger. By thus changing the fiber diameter, the number of actuator fibers that constitute the first actuator unit 2 or the second actuator unit 3 can be freely changed.

In the present embodiment, the first actuator fibers 2c and 2d and the second actuator fibers 3i, 3j, 3k, 3l, 3m, 3n, 3o, and 3p are symmetrically aligned in a line. Specifically, the first actuator fibers 2c and 2d and the second actuator fibers 3i, 3j, 3k, 3l, 3m, 3n, 3o, and 3p are symmetrical with respect to an intermediate line between the two actuator fibers 3i and 3p disposed at ends of the line. With this configuration, no moment is generated in the plate member 5b when the plate member 5b is moved by using the first actuator fibers 2c and 2d or when the plate member 5b is moved by using the first actuator fibers 2c and 2d and the second actuator fibers 3i, 3j, 3k, 3l, 3m, 3n, 3o, and 3p.

In the present embodiment, the first actuator fibers 2c and 2d and the second actuator fibers 3i, 3j, 3k, 3l, 3m, 3n, 3o, and 3p have the same spring shape but have different lengths. Specifically, the actuator 1b is configured such that each of the first actuator fibers has a first spring shape including a first coil diameter, a first spring pitch, and a first wire diameter that is a wire diameter of the high polymer fiber bundles of the first actuator fibers 2c and 2d, and each of the second actuator fibers has a second spring shape including a second coil diameter that is equal to the first coil diameter, a second spring pitch that is equal to the first spring pitch, and a second wire diameter that is a wire diameter of the high polymer fiber bundles of the second actuator fibers 3i, 3j, 3k, 3l, 3m, 3n, 3o, and 3p and is equal to the first wire diameter. Furthermore, the actuator 1b is configured such that the length of the first actuator fibers 2c and 2d and the length of the second actuator fibers 3i, 3j, 3k, 3l, 3m, 3n, 3o, and 3p are different from each other. With this configuration, the actuator fibers that constitute the first actuator unit 2 and the second actuator unit 3 are equal to each other in terms of generated stress and allowable strain, and spring rates of the actuator fibers are inversely proportional to the lengths thereof. Therefore, by adjusting the lengths and the number of actuator fibers, it is possible to easily set a ratio of the spring rate of the first actuator unit 2 and the spring rate of the second actuator unit 3 to a desired value.

In the present embodiment, the first actuator fibers 2c and 2d and the second actuator fibers 3i, 3j, 3k, 3l, 3m, 3n, 3o, and 3p are strained to the same degree when the plate member 5b is displaced by 5D. This allows maximum load that acts on the first actuator unit 2 and the second actuator unit 3 to be constant at this position, thereby making it possible to obtain a more reliable actuator.

In the present embodiment, the actuator fibers are made of nylon. However, the material of the actuator fibers is not limited to this. The actuator fibers can be made of any of various high polymer materials such as polyethylene, PVDF, polyester, or Kevlar.

In the present embodiment, the temperature of the actuator fibers is changed by silver-plating surfaces of the actuator fibers and electrically heating the actuator fibers. This method is easy to handle. However, the present embodiment is not limited to this. The actuator fibers may be electrically heated by plating the surfaces with an electrically conductive material other than silver, by making the actuator fibers electrically conductive by blending an electrically conductive material in the high polymer material, or by winding an electrically conductive material around the actuator fibers. Furthermore, the temperature of the actuator fibers may be changed, for example, by changing the temperature of gas around the actuator fibers or by changing the temperature of liquid that is in contact with the actuator fibers. In a case where the surfaces of the actuator fibers are made electrically conductive, the surfaces may be coated so as to be insulated in order to prevent electrical contact with an adjacent actuator fiber.

In the present embodiment, the first actuator fibers 2c and 2d and the second actuator fibers 3i, 3j, 3k, 3l, 3m, 3n, 3o, and 3p that are disposed so as to be symmetrical with respect to a line have a first end and a second end that are both ends thereof. The actuator fibers are disposed in a first order (in the order of first actuator fiber 2c, second actuator fibers 3l, 3k, 3j, and 3i) from the intermediate line toward the first end, and a reciprocal of a spring rate linearly decreases in this order. Furthermore, the actuator fibers are disposed in a first order (in the order of first actuator fiber 2d, second actuator fibers 3m, 3n, 3o, and 3p) from the intermediate line toward the second end, and a reciprocal of a spring rate linearly decreases in this order. That is, a natural length of an actuator fiber linearly changes in proportion to a reciprocal of a spring rate in one direction, i.e., in the order of the second actuator fibers 3i, 3j, 3k, 3l, and first actuator fiber 2c that are aligned in a line. Furthermore, a natural length of an actuator fiber linearly changes in proportion to a reciprocal of a spring rate in a direction opposite to the one direction, i.e., in the order of the second actuator fibers 3p, 3o, 3n, 3m, and first actuator fiber 2d that are aligned in a line. This makes it possible to improve driving efficiency in a wide load range. However, the present embodiment is not limited to this. A distribution of peaks of efficiency may be changed by adjusting a change in spring rates of the actuator fibers.

In the actuator 1b according to the present embodiment, the second actuator fibers that are located between the intermediate line and the first end and at the first end include at least n (n is an integer that is equal to or larger than 3) actuator fibers, and a spring rate of an actuator fiber located between two actuator fibers included in any three actuator fibers included in the n actuator fibers is smaller than the largest one of spring rates of the three actuator fibers and is larger than the smallest one of the spring rates of the three actuator fibers. For example, the four second actuator fibers 3i, 3j, 3k, and 3l are located between the intermediate line and the first end and at the first end, and the spring rate of the actuator fiber 3k located between the two actuator fibers 3j and 3l included in any three actuator fibers 3j, 3k, and 3l included in these four actuator fibers is smaller than the largest one of the spring rates of the three actuator fibers 3j, 3k, and 3l and is larger than the smallest one of the spring rates of the three actuator fibers 3j, 3k, and 3l. That is, in the actuator 1b, ones that have close spring rates among the second actuator fibers 3i, 3j, 3k, and 3l or among the second actuator fibers 3m, 3n, 3o, and 3p are disposed so as to be adjacent to each other. This reduces a difference in temperature between adjacent actuator fibers, thereby reducing loss resulting from heat transfer. However, the present embodiment is not limited to this. For example, in a case where actuator fibers are disposed at wide intervals, the actuator fibers may be disposed in any combination since the influence of a difference in temperature between adjacent actuator fibers is small.

Embodiment 3

Configuration of Actuator

Figure 11:
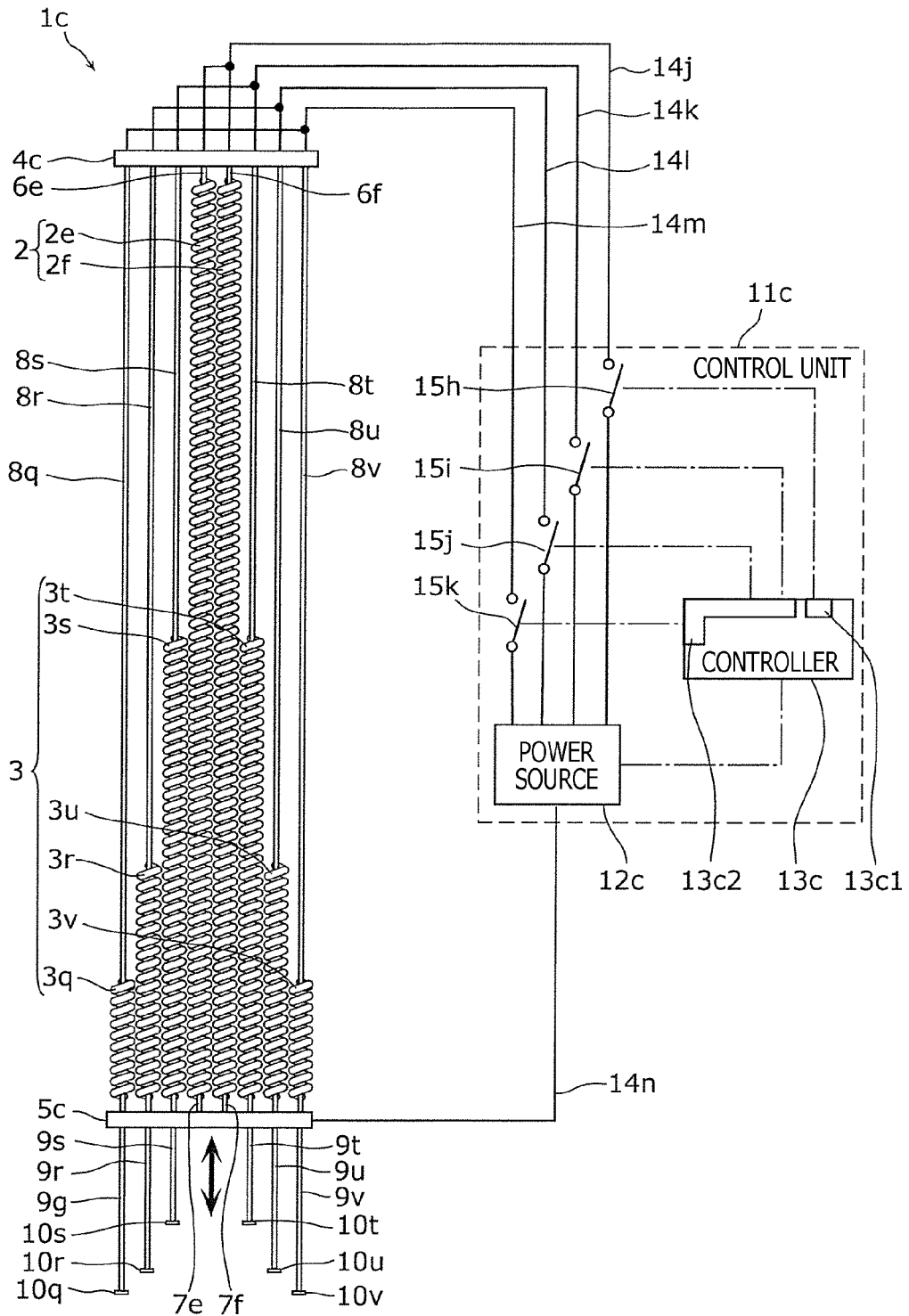
FIG. 11 is a diagram illustrating an outline of an actuator according to Embodiment 3.

FIG. 11 is a diagram illustrating an outline of an actuator 1c according to Embodiment 3.

The actuator 1c includes a first actuator unit 2 and a second actuator unit 3. The first actuator unit 2 and the second actuator unit 3 are located between a plate member 4c, which is an example of a base, and a plate member 5c, which is an example of a displacement member.

The first actuator unit 2 is constituted by two first actuator fibers 2e and 2f that are aligned in a line and have the same spring shape and the same length. The second actuator unit 3 is constituted by two second actuator fibers 3q and 3v that have the same spring shape as the first actuator fibers 2e and 2f and have a length that is one eighth of that of the first actuator fibers 2e and 2f, two second actuator fibers 3r and 3u that have the same spring shape as the first actuator fibers 2e and 2f and have a length that is one fourth of that of the first actuator fibers 2e and 2f, and two second actuator fibers 3s and 3t that have the same spring shape as the first actuator fibers 2e and 2f and have a length that is a half of that of the first actuator fibers 2e and 2f. The second actuator fibers 3q and 3v, the second actuator fibers 3r and 3u, and the second actuator fibers 3s and 3t have different spring rates. Note that the expression "the same spring shape" means that the first actuator fibers 2e and 2f and the second actuator fibers 3q, 3r, 3s, 3t, 3u, and 3v are the same in terms of coil diameter, spring pitch, and wire diameter of a high polymer fiber bundle that will be described later.

Since the second actuator fibers 3q and 3v have a length that is one eighth of that of the first actuator fibers 2e and 2f, the spring rate of the second actuator fibers 3q and 3v is eight times as high as that of the first actuator fibers 2e and 2f. Since the second actuator fibers 3q and 3v have a length that is one eighth of that of the first actuator fibers 2e and 2f, a maximum displacement amount of the actuator fibers 3q and 3v is one eighth of that of the first actuator fibers 2e and 2f during use of the actuator 1c. Similarly, the spring rates of the second actuator fibers 3r and 3u and the second actuator fibers 3s and 3t are four times and two times as high as that of the first actuator fibers 2e and 2f, respectively. Maximum displacement amounts of the second actuator fibers 3r and 3u and the second actuator fibers 3s and 3t are one fourth and a half of that of the first actuator fibers 2e and 2f, respectively.

Each of the first actuator fibers 2e and 2f and the second actuator fibers 3q, 3r, 3s, 3t, 3u, and 3v has a coil-like structure in which a high polymer fiber bundle including one or more twisted high polymer fibers (e.g., nylon fibers) is wound spirally. Surfaces of the first actuator fibers 2e and 2f and the second actuator fibers 3q, 3r, 3s, 3t, 3u, and 3v are silver-plated. The first actuator fibers 2e and 2f and the second actuator fibers 3q, 3r, 3s, 3t, 3u, and 3v are resistively-heated (electrically heated) upon application of electricity and stretch or contract in accordance with a change in temperature caused by the electric heating. In the present embodiment, a direction of twisting of the high polymer fiber bundle and a direction of winding of the spiral are the same as each other, and the entire length of each of the first actuator fibers 2e and 2f and the second actuator fibers 3q, 3r, 3s, 3t, 3u, and 3v contracts upon application of heat.

One ends of the first actuator fibers 2e and 2f are connected to the plate member 4c via connection members 6e and 6f, respectively. Similarly, one ends of the second actuator fibers 3q, 3r, 3s, 3t, 3u, and 3v are connected to the plate member 4c via connection members 8q, 8r, 8s, 8t, 8u, and 8v, respectively. The other ends of the first actuator fibers 2e and 2f are connected to the plate member 5c via connection members 7e and 7f, respectively. One ends of connection members 9q, 9r, 9s, 9t, 9u, and 9v are connected to the other ends of the second actuator fibers 3q, 3r, 3s, 3t, 3u, and 3v, respectively.

Each of the connection members 6e and 6f, the connection members 7e and 7f, the connection members 8q, 8r, 8s, 8t, 8u, and 8v, and the connection members 9q, 9r, 9s, 9t, 9u, and 9v is, for example, made of a linear material. According to this arrangement, the actuator 1c can be given flexibility against bending. The material can be high polymer fibers, carbon fibers, a metal wire, or the like. The high polymer fibers and the carbon fibers are light in weight. The metal wire may be a material, such as a superelastic alloy, having flexibility against bending.

Through-holes pass through the plate member 5c in a top-to-bottom direction of FIG. 11, and the connection members 9q, 9r, 9s, 9t, 9u, and 9v are inserted into the through-holes. The plate member 5c is slidable in the top-to-bottom direction relative to the connection members 9q, 9r, 9s, 9t, 9u, and 9v. End members 10q, 10r, 10s, 10t, 10u, and 10v having electric conductivity are connected to the other ends of the connection members 9q, 9r, 9s, 9t, 9u, and 9v, respectively. When the plate member 5c connected to the first actuator fibers 2e and 2f moves in the downward direction of FIG. 11 and sequentially makes contact with the end members 10s and 10t, the end members 10r and 10u, and the end members 10q and 10v, tension acts on the second actuator fibers 3s and 3t via the connection members 9s and 9t, on the second actuator fibers 3r and 3u via the connection members 9r and 9u, and on the second actuator fibers 3q and 3v via the connection members 9q and 9v.

The actuator 1c is driven by a control unit 11c. More specifically, the control unit 11c includes a power source 12c, a controller 13c (including a first controller 13c1 and a second controller 13c2), and switches 15h, 15i, 15j, and 15k. The first controller 13c1 switches a connection state between a wire 14j and the power source 12c by switching on and off the switch 15h and thus control electricity application to the first actuator fibers 2e and 2f. The second controller 13c2 switches connection states between wires 14k, 14l, and 14m and the power source 12c by switching on and off the switches 15i, 15j, and 15k and thus control electricity application to the second actuator fibers 3q, 3r, 3s, 3t, 3u, and 3v. The wire 14j is electrically connected to the first actuator fibers 2e and 2f via a first electrode unit provided on the plate member 4c and via the connection members 6e and 6f. The wire 14k is electrically connected to the second actuator fibers 3s and 3t via a second electrode unit provided on the plate member 4c and via the connection members 8s and 8t. The wire 14l is electrically connected to the second actuator fibers 3r and 3u via a third electrode unit provided on the plate member 4c and via the connection members 8r and 8u. The wire 14m is electrically connected to the second actuator fibers 3q and 3v via a fourth electrode unit provided on the plate member 4c and via the connection members 8q and 8v. The plate member 4c is configured so that the first electrode unit, the second electrode unit, the third electrode unit, and the fourth electrode unit are not electrically conductive with each other. A voltage converter (not illustrated) is provided between the power source 12c and each of the switches 15h, 15i, 15j, and 15k. These voltage converters make voltages applied to the first actuator fibers 2e and 2f and the second actuator fibers 3q, 3r, 3s, 3t, 3u, and 3v different from each other.

In a case where the connection members 6e and 6f and the connection members 8q, 8r, 8s, 8t, 8u, and 8v are made of an electrically conductive material, the connection members 6e and 6f and the connection members 8q, 8r, 8s, 8t, 8u, and 8v can be used as wires as they are. In a case where the connection members 6e and 6f and the connection members 8q, 8r, 8s, 8t, 8u, and 8v are made of a material that is not electrically conductive, electrical connection between the wire 14j and the first actuator fibers 2e and 2f, electrical connection between the wire 14k and the second actuator fibers 3s and 3t, electrical connection between the wire 14l and the second actuator fibers 3r and 3u, and electrical connection between the wire 14m and the second actuator fibers 3q and 3v may be secured, for example, by metal-plating surfaces of the connection members 6e and 6f and the connection members 8q, 8r, 8s, 8t, 8u, and 8v or forming an electrically conductive material on the surfaces. Although in the present embodiment, the power source 12c and the first actuator fibers 2e and 2f and the second actuator fibers 3q, 3r, 3s, 3t, 3u, and 3v are electrically connected to each other via the plate member 4c, the connection members 6e and 6f, and the connection members 8q, 8r, 8s, 8t, 8u, and 8v, the present embodiment is not limited to this. The first actuator fibers 2e and 2f and the second actuator fibers 3q, 3r, 3s, 3t, 3u, and 3v may be directly connected to the corresponding wires 14j, 14k, 14l, and 14m.

Furthermore, a wire 14n is connected to the power source 12c. The wire 14n is connected to the plate member 5c. A fifth electrode unit, a sixth electrode unit, a seventh electrode unit, and an eighth electrode unit that are a plurality of electrode units are provided on a lower surface (surface on the lower side in FIG. 11) of the plate member 5c so as not to be electrically conductive with each other. The fifth electrode unit is provided on the lower surface of the plate member 5c at a position corresponding to the first actuator fibers 2e and 2f, the sixth electrode unit is provided on the lower surface of the plate member 5c at a position corresponding to the second actuator fibers 3s and 3t, the seventh electrode unit is provided on the lower surface of the plate member 5c at a position corresponding to the second actuator fibers 3r and 3u, and the eighth electrode unit is provided on the lower surface of the plate member 5c at a position corresponding to the second actuator fibers 3q and 3v.

The wire 14n and the first actuator fibers 2e and 2f are always electrically connected to each other. In this actuator 1c, the wire 14n and the second actuator fibers 3s and 3t are electrically connected to each other in a case where the end members 10s and 10t make contact with the sixth electrode unit; the wire 14n and the second actuator fibers 3r and 3u are electrically connected to each other in a case where the end members 10r and 10u make contact with the seventh electrode unit; and the wire 14n and the second actuator fibers 3q and 3v are electrically connected to each other in a case where the end members 10q and 10v make contact with the eighth electrode unit. That is, the wire 14n is electrically connected to the first actuator fibers 2e and 2f via the fifth electrode unit and the connection members 7e and 7f, is electrically connected to the second actuator fibers 3s and 3t via the sixth electrode unit, the end members 10s and 10t, and the connection members 9s and 9t, is electrically connected to the second actuator fibers 3r and 3u via the seventh electrode unit, the end members 10r and 10u, and the connection members 9r and 9u, and is electrically connected to the second actuator fibers 3q and 3v via the eighth electrode unit, the end members 10q and 10v, and the connection members 9q and 9v.

In a case where the connection members 7e and 7f and the connection members 9q, 9r, 9s, 9t, 9u, and 9v are made of an electrically conductive material, the connection members 7e and 7f and the connection members 9q, 9r, 9s, 9t, 9u, and 9v can be used as wires as they are. In a case where the connection members 7e and 7f and the connection members 9q, 9r, 9s, 9t, 9u, and 9v are made of a material that is not electrically conductive, electrical connection between the wire 14n and the first actuator fibers 2e and 2f, electrical connection between the wire 14n and the second actuator fibers 3s and 3t, electrical connection between the wire 14n and the second actuator fibers 3r and 3u, and electrical connection between the wire 14n and the second actuator fibers 3q and 3v may be secured, for example, by metal-plating surfaces of the connection members 7e and 7f and the connection members 9q, 9r, 9s, 9t, 9u, and 9v or forming an electrically conductive material on the surfaces. An insulation process is performed between the connection members 9q, 9r, 9s, 9t, 9u, and 9v and the plate member 5c (e.g., in the through-holes of the plate member 5c) so that the connection members 9q, 9r, 9s, 9t, 9u, and 9v are not electrically connected to the wire 14n without the end members 10q, 10r, 10s, 10t, 10u, and 10v.

Next, operation of the actuator 1c is described.

In the actuator 1c illustrated in FIG. 11, the plate member 4c is fixed, and the plate member 5c is configured to be freely movable in the top-bottom direction of FIG. 11 in a state where load is applied in the downward direction of FIG. 11. In a case where the load is small, the load is supported by the first actuator fibers 2e and 2f, the plate member 5c and the end members 10q, 10r, 10s, 10t, 10u, and 10v do not make contact with each other. When the load becomes higher, the load cannot be supported by the first actuator fibers 2e and 2f, and the plate member 5c and the end members 10s and 10t make contact with each other. As a result, the load is supported by the first actuator fibers 2e and 2f and the second actuator fibers 3s and 3t. When the load further becomes higher, the plate member 5c sequentially makes contact with the end members 10r and 10u and the end members 10q and 10v. In this way, the second actuator fibers 3r and 3u and the second actuator fibers 3q and 3v are sequentially added as actuator fibers that support the load.

In the present embodiment, an amount by which the plate member 5c is displaced relative to the plate member 4c when load is maximum is referred to as a maximum displacement amount. Furthermore, an amount by which the plate member 5c is displaced relative to the plate member 4c when the end members 10s and 10t make contact with or are separated from the plate member 5c is referred to as a first displacement amount, an amount by which the plate member 5c is displaced relative to the plate member 4c when the end members 10r and 10u make contact with or are separated from the plate member 5c is referred to as a second displacement amount, and an amount by which the plate member 5c is displaced relative to the plate member 4c when the end members 10q and 10v make contact with or are separated from the plate member 5c is referred to as a third displacement amount.

However, in a case where the second actuator fibers 3s and 3t are not present, an amount by which the plate member 5c is displaced relative to the plate member 4c when the end members 10r and 10u make contact with or are separated from the plate member 5c may be referred to as a first displacement amount, and an amount by which the plate member 5c is displaced relative to the plate member 4c when the end members 10q and 10v make contact with or are separated from the plate member 5c may be referred to as a second displacement amount. Furthermore, in a case where the second actuator fibers 3r and 3u are not present either, an amount by which the plate member 5c is displaced relative to the plate member 4c when the end members 10q and 10v make contact with or are separated from the plate member 5c may be referred to as a first displacement amount.

In a case where the actuator 1c is in operation, the controller 13c of the control unit 11c short-circuits or open-circuits the switches 15h, 15i, 15j, and 15k. In a case where the displacement amount of the plate member 5c relative to the plate member 4c is smaller than the first displacement amount, the first actuator fibers 2e and 2f are electrically heated, and contracting force is generated upward (in the upward direction of FIG. 11) in the first actuator fibers 2e and 2f. In a case where the displacement amount of the plate member 5c relative to the plate member 4c is equal to or larger than the first displacement amount and smaller than the second displacement amount, the first actuator fibers 2e and 2f and the second actuator fibers 3s and 3t are electrically heated, and contracting force is generated upward in the first actuator fibers 2e and 2f and the second actuator fibers 3s and 3t. In a case where the displacement amount of the plate member 5c relative to the plate member 4c is equal to or larger than the second displacement amount and smaller than the third displacement amount, the first actuator fibers 2e and 2f and the second actuator fibers 3r, 3s, 3t, and 3u are electrically heated, and contracting force is generated upward in the first actuator fibers 2e and 2f and the second actuator fibers 3r, 3s, 3t, and 3u. In a case where the displacement amount of the plate member 5c relative to the plate member 4c is equal to or larger than the third displacement amount and equal to or smaller than the maximum displacement amount, all of the first actuator fibers 2e and 2f and the second actuator fibers 3q, 3r, 3s, 3t, 3u, and 3v are electrically heated, and contracting force is generated upward in all of the actuator fibers.

In the actuator 1c according to the present embodiment, in a case where the displacement amount of the plate member 5c relative to the plate member 4c is smaller than the first displacement amount, the temperature of the first actuator fibers 2e and 2f is controlled by application of electricity to the first actuator fibers 2e and 2f and the temperature of the second actuator fibers 3q, 3r, 3s, 3t, 3u, and 3v is not controlled, so that load is held by the first actuator unit 2. Meanwhile, in a case where the displacement amount of the plate member 5c relative to the plate member 4c is equal to or larger than the first displacement amount and equal to or smaller than the maximum displacement amount, the temperature of the first actuator fibers 2e and 2f is controlled by application of electricity to the first actuator fibers 2e and 2f and the temperature of the second actuator fibers 3q, 3r, 3s, 3t, 3u, and 3v is controlled by application of electricity to the second actuator fibers 3s and 3t, the second actuator fibers 3r, 3s, 3t, and 3u, or the second actuator fibers 3q, 3r, 3s, 3t, 3u, and 3v, so that load is held by both of the first actuator unit 2 and the second actuator unit 3.

Effects of Actuator

Figure 12:
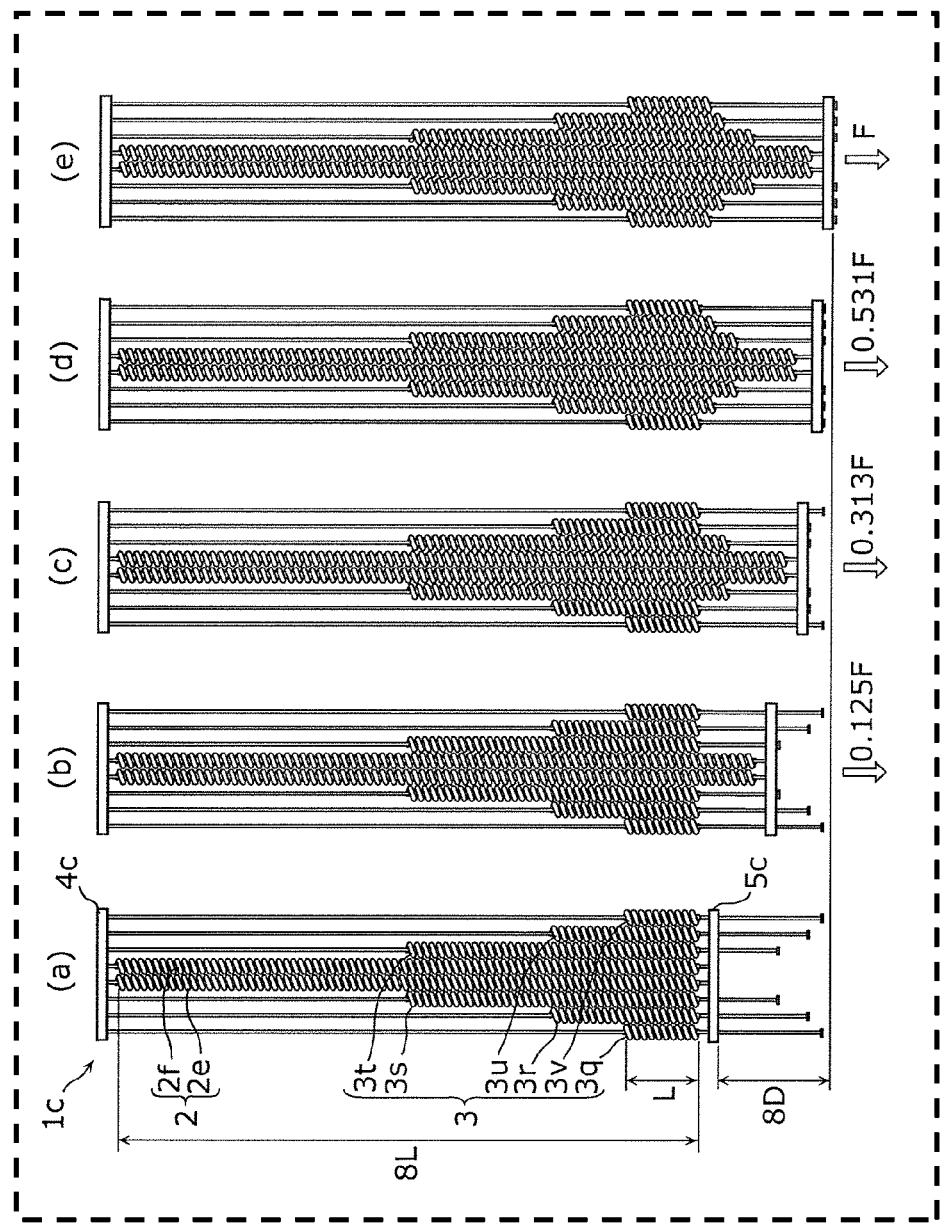
FIG. 12 is a diagram illustrating an outline of a case where various loads are applied to the actuator according to Embodiment 3.

FIG. 12 is a diagram illustrating an outline of a case where various loads are applied to the actuator 1c according to Embodiment 3. In the actuator 1c, a natural length of the first actuator fibers 2e and 2f is 8L, a natural length of the second actuator fibers 3s and 3t is 4L, a natural length of the second actuator fibers 3r and 3u is 2L, and a natural length of the second actuator fibers 3q and 3v is L. When the plate member 5c is displaced by 4D relative to the plate member 4c (when a displacement amount is 4D), the end members 10s and 10t and the plate member 5c make contact with each other. When the plate member 5c is displaced by 6D relative to the plate member 4c, the end members 10r and 10u and the plate member 5c further make contact with each other. When the plate member 5c is displaced by 7D relative to the plate member 4c, the end members 10q and 10v and the plate member 5c further make contact with each other. Note that it is assumed that values of L, D, T, and used for description of the present embodiment are identical to those in Comparative Example 1, but values of F and J are four fifths of those in Embodiment 1 since the number of actuator fibers in the present embodiment is four fifths of that in Embodiment 1.

FIG. 12(a) illustrates a state where no load is applied to the plate member 5c and the first actuator fibers 2e and 2f and the second actuator fibers 3q, 3r, 3s, 3t, 3u, and 3v have a natural length. FIG. 12(b) illustrates a state where the plate member 5c is displaced by 4D relative to the plate member 4c and the plate member 5c and the end members 10s and 10t are about to make contact with each other. In this state, the load is 0.125 F. FIG. 12(c) illustrates a state where the plate member 5c is displaced by 6D relative to the plate member 4c and the plate member 5c and the end members 10r and 10u are about to make contact with each other. In this state, the load is 0.313 F. FIG. 12(d) illustrates a state where the plate member 5c is displaced by 7D relative to the plate member 4c and the plate member 5c and the end members 10q and 10v are about to make contact with each other. In this state, the load is 0.531 F. FIG. 12(e) illustrates a state where the plate member 5c is displaced by 8D relative to the plate member 4c and the plate member 5c and the end members 10q, 10r, 10s, 10t, 10u, and 10v are about to make contact with each other. In this state, the load is F. In this state, the first actuator fibers 2e and 2f having a natural length of 8L is displaced by 8D, the second actuator fibers 3s and 3t having a natural length of 4L is displaced by 4D, the second actuator fibers 3r and 3u having a natural length of 2L is displaced by 2D, and the second actuator fibers 3q and 3v having a natural length of L is displaced by D, and strain and tension are equal to each other in all of the actuator fibers.

Note that the load in each state is equal to the sum of values obtained by multiplying a spring rate and a displacement amount of each actuator fiber on which tension is acting. In the present embodiment, the first displacement amount of the plate member 5c relative to the plate member 4c is a displacement amount 4D, the second displacement amount of the plate member 5c relative to the plate member 4c is a displacement amount 6D, the third displacement amount of the plate member 5c relative to the plate member 4c is a displacement amount 7D, and the maximum displacement amount of the plate member 5c relative to the plate member 4c is a displacement amount 8D.

FIG. 13 is a table illustrating driving efficiency of the actuator 1c in the states illustrated in FIG. 12. A change in temperature that is needed to generate displacement of $\Delta L$ in this actuator is $0.125\Delta T$ in the first actuator fibers 2e and 2f, $0.25\Delta T$ in the second actuator fibers 3s and 3t, $0.5\Delta T$ in the second actuator fibers 3r and 3u, and $\Delta T$ in the second actuator fibers 3q and 3v. Accordingly, the input energy in the state illustrated in FIG. 12(b) is only 0.25 J since it is only necessary to heat the first actuator fibers 2e and 2f. The input energy in the state illustrated in FIG. 12(c) is only 0.5 J since it is only necessary to heat the first actuator fibers 2e and 2f and the second actuator fibers 3s and 3t. The input energy in the state illustrated in FIG. 12(d) is only 0.75 J since it is only necessary to heat the first actuator fibers 2e and 2f and the second actuator fibers 3r, 3s, 3t, and 3u. The input energy in the state illustrated in FIG. 12(e) is J since each of the first actuator fibers 2e and 2f and the second actuator fibers 3q, 3r, 3s, 3t, 3u, and 3v is heated. The driving efficiency calculated from this is 0.5η in the state illustrated in FIG. 12(b), which is four times as high as that in the comparative examples under the same load. The driving efficiency is 0.625η in the state illustrated in FIG. 12(c), which is two times as high as that in the comparative examples under the same load. The driving efficiency is 0.708η in the state illustrated in FIG. 12(d), which is 1.33 times as high as that in the comparative examples under the same load. The driving efficiency is η in the state illustrated in FIG. 12(e), which is equal to that in the comparative examples under the same load.

Figure 14:
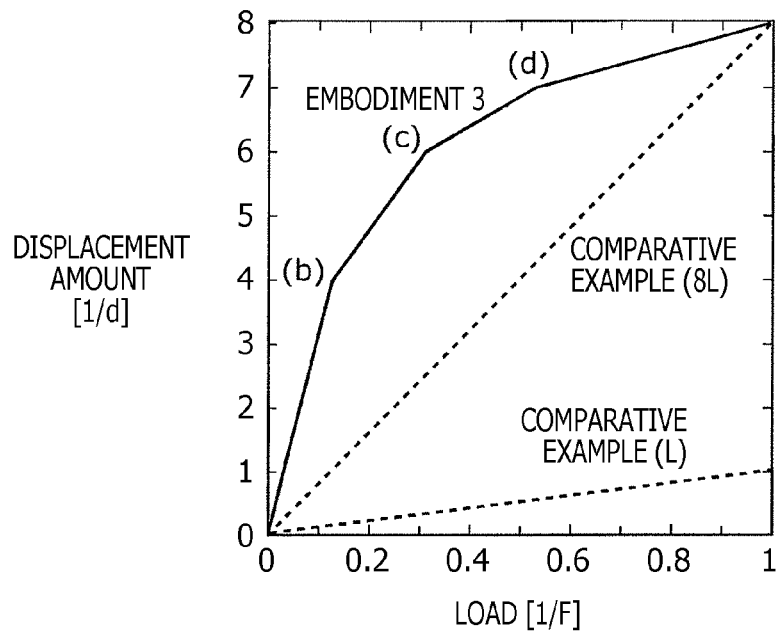
FIG. 14 is a diagram illustrating a relationship between load and a displacement amount in the actuator according to Embodiment 3.
Figure 15:
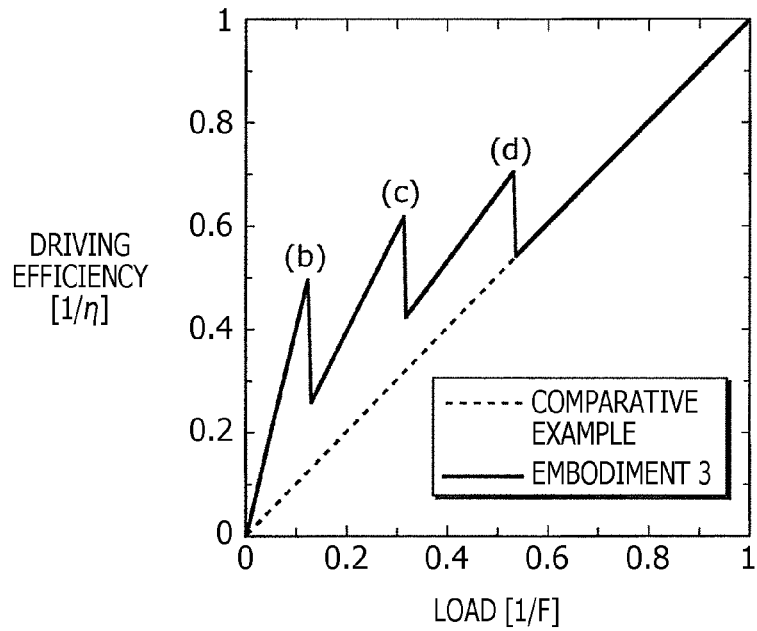
FIG. 15 is a diagram illustrating a relationship between load and driving efficiency in the actuator according to Embodiment 3.

FIG. 14 is a diagram illustrating a relationship between load and a displacement amount in the actuator 1c. In FIG. 14, Comparative Example (L) is a result of the comparative example illustrated in FIGS. 19 and 20 in which an actuator element has a natural length of L, and Comparative Example (8L) is a result of the comparative example in which an actuator element has a natural length of 8L. In the comparative examples, a displacement amount has linear spring characteristics, i.e., increases in proportion to load. Meanwhile, the actuator 1c according to the present embodiment exhibits non-linear spring characteristics, i.e., the spring rate increases as the number of actuator fibers that support the load increases. The positions indicated by (b), (c), and (d) in FIG. 14 correspond to the states indicated by (b), (c), and (d) in FIGS. 12 and 13. FIG. 15 is a diagram illustrating a relationship between load and driving efficiency in the actuator 1c. As is clear from FIG. 15, the driving efficiency is higher than that in the comparative examples until the load becomes 0.531 F ((e) in FIG. 15). Such characteristics are effective especially in a case where an actuator need be durable up to the load F from the perspective of safety and the load normally fluctuates at a low level.

According to the present embodiment, the plate member 5c can be displaced by changing the temperature of the first actuator fibers 2e and 2f in a case where load that acts on the plate member 5c is smaller than allowable maximum load that can be held by tension of both of the first actuator fibers 2e and 2f and the second actuator fibers 3q, 3r, 3s, 3t, 3u, and 3v and the load can be supported by tension of the first actuator fibers 2e and 2f. In this case, thermal energy can be made smaller by an amount needed to change the temperature of the second actuator fibers 3q, 3r, 3s, 3t, 3u, and 3v than that needed in a case where load is supported by tension of both of the first actuator fibers 2e and 2f and the second actuator fibers 3q, 3r, 3s, 3t, 3u, and 3v. This allows the actuator 1c according to the present embodiment to have higher driving efficiency under low load than that in the actuators of the comparative examples in which the driving efficiency is low under low load. It is therefore possible to obtain the actuator 1c that has improved driving efficiency under load that is lower than allowable maximum load.

Furthermore, according to the present embodiment, since a plurality of second actuator fibers that have different spring rates are provided, the plate member 5c can be displaced by changing the temperature of the first actuator fibers 2e and 2f and the second actuator fibers 3r, 3s, 3t, and 3u, for example, in a case where load that acts on the plate member 5c can be held by tension of the first actuator fibers 2e and 2f and the second actuator fibers 3r, 3s, 3t, and 3u. In this case, thermal energy can be made smaller by an amount needed to change the temperature of the second actuator fibers 3q and 3v than that needed in a case where load is supported by tension of both of the first actuator fibers 2e and 2f and the second actuator fibers 3q, 3r, 3s, 3t, 3u, and 3v. This makes it possible to improve driving efficiency under low load. In the case where a plurality of second actuator fibers having spring rates are provided, peaks of driving efficiency can be generated at a plurality of loads as illustrated in FIG. 15. It is therefore possible to increase the freedom of design.

In the present embodiment, since electricity can be applied to the second actuator fibers 3q, 3r, 3s, 3t, 3u, and 3v when the plate member 5c is displaced and makes contact with the end members 10q, 10r, 10s, 10t, 10u, and 10v, the second actuator fibers 3q, 3r, 3s, 3t, 3u, and 3v are electrically heated and the temperature thereof is changed in a state where tension is acting on the second actuator fibers 3q, 3r, 3s, 3t, 3u, and 3v. With this configuration, it is unnecessary to consume unnecessary energy by changing the temperature of the second actuator fibers 3q, 3r, 3s, 3t, 3u, and 3v in a case where load can be supported by the first actuator fibers 2e and 2f. This makes it possible to improve the driving efficiency. However, the present embodiment is not limited to this configuration. It is also possible to employ a configuration in which the connection members 9q, 9r, 9s, 9t, 9u, and 9v and the plate member 5c are connected to each other via switches that are turned on and off on the basis of tension that acts on the connection members 9q, 9r, 9s, 9t, 9u, and 9v or a configuration in which tension that acts on the second actuator fibers 3q, 3r, 3s, 3t, 3u, and 3v is measured by a strain sensor or the like and the controller 13c switches on and off the switches 15i, 15j, and 15k on the basis of information thus obtained. Furthermore, it is also possible to employ a configuration in which the controller 13c switches on and off the switches 15i, 15j, and 15k in a case where the plate member 5c is in a displacement range in which it is estimated that tension acts on the second actuator fibers 3q, 3r, 3s, 3t, 3u, and 3v instead of directly measuring the tension.

In the present embodiment, in a case where a displacement amount of the plate member 5c relative to the plate member 4c is equal to or larger than the first displacement amount and is equal to or smaller than the second displacement amount, displacement amounts are controlled by using the first controller 13c1 and the second controller 13c2 so that an amount obtained by subtracting the first displacement amount from a displacement amount of the first actuator unit 2 is equal to a displacement amount of a driven part of the second actuator unit 3. Furthermore, in a case where the relative position is equal to or larger than the second displacement amount and is equal to or smaller than the third displacement amount, displacement amounts are controlled by using the first controller 13c1 and the second controller 13c2 so that an amount obtained by subtracting the second displacement amount from the displacement amount of the first actuator unit 2 is equal to a displacement amount of a driven part of the second actuator unit 3. Furthermore, in a case where the relative position is equal to or larger than the third displacement amount and is equal to or smaller than the maximum displacement amount, displacement amounts are controlled by using the first controller 13c1 and the second controller 13c2 so that an amount obtained by subtracting the third displacement amount from the displacement amount of the first actuator unit 2 is equal to a displacement amount of a driven part of the second actuator unit 3. This is achieved by changing the temperature of the first actuator fibers 2e and 2f and the second actuator fibers 3q, 3r, 3s, 3t, 3u, and 3v so that each of the first actuator fibers 2e and 2f and second actuator fibers 3q, 3r, 3s, 3t, 3u, and 3v is displaced by ΔL. According to this configuration, it is possible to minimize a variation in load between the first actuator fibers 2e and 2f and the second actuator fibers 3q, 3r, 3s, 3t, 3u, and 3v, thereby avoiding a problem such as shortening of lifetime of specific actuator fibers.

In the present embodiment, the first actuator unit 2 is constituted by the first actuator fibers 2e and 2f that are aligned in a line, and the second actuator unit 3 is constituted by the second actuator fibers 3s and 3t, the second actuator fibers 3r and 3u, and the second actuator fibers 3q and 3v that are aligned in a line. In such a case where load is held by a plurality of actuator fibers that are aligned in a line, each of the actuator fibers can be made thin, and therefore a thinner actuator 1c can be obtained. However, the present embodiment is not limited to this. The first actuator fibers or the second actuator fibers may be constituted by a single actuator fiber or may be constituted by a different number of actuator fibers that are aligned in a line. It can be assumed that a spring rate of a coil spring is proportional to the square of a dimeter of an actuator fiber (a diameter of a cross section taken along a direction perpendicular to a central axis of a high polymer fiber bundle) if the length is the same and the shape is similar. Therefore, for example, the first actuator unit 2 that is constituted by the two first actuator fibers 2e and 2f can be replaced with a single actuator fiber by making the diameter of the actuator fiber $\sqrt{2}$ times larger. Similarly, the second actuator unit 3 can be replaced with a single actuator fiber by making the diameter of the actuator fiber $\sqrt{2}$ times larger. By thus changing the fiber diameter, the number of actuator fibers that constitute the first actuator unit 2 or the second actuator unit 3 can be freely changed.

In the present embodiment, the first actuator fibers 2e and 2f and the second actuator fibers 3q, 3r, 3s, 3t, 3u, and 3v are symmetrically disposed. Specifically, the first actuator fibers 2e and 2f and/or the second actuator fibers 3q, 3r, 3s, 3t, 3u, and 3v are symmetrical with respect to an intermediate line between the two actuator fibers 3q and 3v located on both ends in a direction in which these actuator fibers are aligned. With this configuration, no moment is generated in the plate member 5c when the plate member 5c is moved by using the first actuator fibers 2e and 2f or by using not only the first actuator fibers 2e and 2f but also the second actuator fibers 3q, 3r, 3s, 3t, 3u, and 3v.

In the present embodiment, the first actuator fibers 2e and 2f and the second actuator fibers 3q, 3r, 3s, 3t, 3u, and 3v have the same spring shape but have different lengths. Specifically, the actuator 1c is configured such that each of the first actuator fibers has a first spring shape including a first coil diameter, a first spring pitch, and a first wire diameter that is a wire diameter of the high polymer fiber bundles of the first actuator fibers 2e and 2f, and each of the second actuator fibers has a second spring shape including a second coil diameter that is equal to the first coil diameter, a second spring pitch that is equal to the first spring pitch, and a second wire diameter that is a wire diameter of the high polymer fiber bundles of the second actuator fibers 3q, 3r, 3s, 3t, 3u, and 3v and is equal to the first wire diameter. Furthermore, the actuator 1c is configured such that the length of the first actuator fibers 2e and 2f and the length of the second actuator fibers 3q, 3r, 3s, 3t, 3u, and 3v are different from each other. With this configuration, the actuator fibers that constitute the first actuator unit 2 and the second actuator unit 3 are equal to each other in terms of generated stress and allowable strain, and spring rates of the actuator fibers are inversely proportional to the lengths thereof. Therefore, by adjusting the lengths and the number of actuator fibers, it is possible to easily set a ratio of the spring rate of the first actuator unit 2 and the spring rate of the second actuator unit 3 to a desired value.

In the present embodiment, the first actuator fibers 2e and 2f and the second actuator fibers 3q, 3r, 3s, 3t, 3u, and 3v are strained to the same degree when the plate member 5c is displaced by 5D. This allows maximum load that acts on the first actuator unit 2 and the second actuator unit 3 to be constant at this position, thereby making it possible to obtain a more reliable actuator.

In the present embodiment, the actuator fibers are made of nylon. However, the material of the actuator fibers is not limited to this. The actuator fibers can be made of any of various high polymer materials such as polyethylene, PVDF, polyester, or Kevlar.

In the present embodiment, the temperature of the actuator fibers is changed by silver-plating surfaces of the actuator fibers and electrically heating the actuator fibers. This method is easy to handle. However, the present embodiment is not limited to this. The actuator fibers may be electrically heated by plating the surfaces with an electrically conductive material other than silver, by making the actuator fibers electrically conductive by blending an electrically conductive material in the high polymer material, or by winding an electrically conductive material around the actuator fibers. Furthermore, the temperature of the actuator fibers may be changed, for example, by changing the temperature of gas around the actuator fibers or by changing the temperature of liquid that is in contact with the actuator fibers. In a case where the surfaces of the actuator fibers are made electrically conductive, the surfaces may be coated so as to be insulated in order to prevent electrical contact with an adjacent actuator fiber.

In the present embodiment, the first actuator fibers 2e and 2f and the second actuator fibers 3q, 3r, 3s, 3t, 3u, and 3v that are disposed so as to be symmetrical with respect to a line have a first end and a second end that are both ends thereof. The actuator fibers are disposed in a first order (in the order of first actuator fiber 2e, second actuator fibers 3s, 3r, and 3q) from the intermediate line toward the first end, and a reciprocal of a spring rate exponentially decreases in this order. Furthermore, the actuator fibers are disposed in a first order (in the order of first actuator fiber 2f, second actuator fibers 3t, 3u, and 3v) from the intermediate line toward the second end, and a reciprocal of a spring rate exponentially decreases in this order. That is, a natural length of an actuator fiber exponentially changes in proportion to a reciprocal of a spring rate in one direction, i.e., in the order of the second actuator fibers 3q, 3r, 3s, and first actuator fiber 2e that are aligned in a line. Furthermore, a natural length of an actuator fiber exponentially changes in proportion to a reciprocal of a spring rate in a direction opposite to the one direction, i.e., in the order of the second actuator fibers 3v, 3u, 3t, and first actuator fiber 2f that are aligned in a line. This makes it possible to improve driving efficiency in a wide load range. As compared with Embodiment 2, the entire lengths of the actuator fibers are longer, but the driving efficiency can be made higher. However, the present embodiment is not limited to this. A distribution of peaks of efficiency may be changed by adjusting a change in spring rates of the actuator fibers.

In the actuator 1c according to the present embodiment, the second actuator fibers located between the intermediate line and the first end and at the first end include at least n (n is an integer that is equal to or larger than 3) actuator fibers, and a spring rate of an actuator fiber located between two actuator fibers included in any three actuator fibers included in the n actuator fibers is smaller than the largest one of spring rates of the three actuator fibers and is larger than the smallest one of the spring rates of the three actuator fibers. For example, the three second actuator fibers $3q$, $3r$, and $3s$ are located between the intermediate line and the first end and at the first end, and the spring rate of the second actuator fibers $3r$ located between the two second actuator fibers $3q$ and $3s$ included in the second actuator fibers $3q$, $3r$, and $3s$ is smaller than the largest one of the spring rates of the three second actuator fibers $3q$, $3r$, and $3s$ and is larger than the smallest one of the spring rates of the three second actuator fibers $3q$, $3r$, and $3s$. That is, in the actuator $1c$, ones that have close spring rates among the second actuator fibers $3q$, $3r$, and $3s$ or among the second actuator fibers $3t$, $3u$, and $3v$ are disposed so as to be adjacent to each other. This reduces a difference in temperature between adjacent actuator fibers, thereby reducing loss resulting from heat transfer. However, the present embodiment is not limited to this. For example, in a case where actuator fibers are disposed at wide intervals, the actuator fibers may be disposed in any combination since the influence of a difference in temperature between adjacent actuator fibers is small.

An actuator according to one or more aspects has been described above on the basis of the embodiments, but the present disclosure is not limited to the embodiments. Various modifications of the embodiments which a person skilled in the art can think of and combinations of the constituent elements in different embodiments may also be encompassed within the scope of the one or more aspects as long as such modifications and combinations are not deviated from the purpose of the present disclosure.

An actuator according to the present disclosure is applicable, for example, as an artificial muscle actuator for driving a machine that works close to a human. Furthermore, an actuator according to the present disclosure is applicable as a safe linear actuator that has flexibility against external force, a light-weight linear actuator, or a planar fabric actuator that can be bent.

What is claimed is:

1. An actuator comprising:
    a first actuator unit including one or more first actuator fibers;
    a second actuator unit including one or more second actuator fibers;
    a base; and
    a displacement member,
    wherein each of the one or more first actuator fibers and the one or more second actuator fibers has a structure in which a high polymer fiber bundle is wound spirally,
    wherein the high polymer fiber bundle includes one or more twisted high polymer fibers,
    wherein each of the one or more first actuator fibers and the one or more second actuator fibers stretches or contracts when temperature of the high polymer fiber bundle that each of the one or more first actuator fibers and the one or more second actuator fibers includes is changed,
    wherein the first actuator unit stretches or contracts by using the one or more first actuator fibers, and the second actuator unit stretches or contracts by using the one or more second actuator fibers,
    wherein a spring rate of each of the one or more second actuator fibers is higher than a spring rate of each of the one or more first actuator fibers,
    wherein a maximum displacement amount of the second actuator unit is smaller than a maximum displacement amount of the first actuator unit,
    wherein the first actuator unit and the second actuator unit are located between the base and the displacement member,
    wherein temperature of the one or more first actuator fibers is controlled and temperature of the one or more second actuator fibers is not controlled in a case where a displacement amount of the displacement member relative to the base is smaller than a first displacement amount, and
    wherein the temperature of the one or more first actuator fibers is controlled and the temperature of the one or more second actuator fibers are controlled in a case where the displacement amount of the displacement member relative to the base is equal to or larger than the first displacement amount and equal to or smaller than a maximum displacement amount of the displacement member relative to the base.

2. The actuator according to claim 1, wherein
    the displacement member includes a plurality of electrode units;
    the plurality of electrode units correspond to the one or more first actuator fibers and the one or more second actuator fibers;
    in a case where the displacement amount is smaller than the first displacement amount, the temperature of the one or more first actuator fibers is controlled by electricity application using a corresponding one of the plurality of electrode units, and no electricity is applied to the one or more second actuator fibers; and
    in a case where the displacement amount is equal to or larger than the first displacement amount and is equal to or smaller than the maximum displacement amount, the temperature of the one or more first actuator fibers and the temperature of the one or more second actuator fibers are controlled by electricity application using the corresponding plurality of electrode units.

3. The actuator according to claim 1, further comprising a control unit including a first controller that controls electricity application to the one or more first actuator fibers and a second controller that controls electricity application to the one or more second actuator fibers.

4. The actuator according to claim 3, wherein
    the control unit causes the first controller and the second controller to make an amount obtained by subtracting the first displacement amount from a displacement amount of the first actuator unit equal to a displacement amount of the second actuator unit in a case where the displacement amount of the displacement member is equal to or larger than the first displacement amount and equal to or smaller than the maximum displacement amount.

5. The actuator according to claim 1, wherein
    the one or more first actuator fibers and the one or more second actuator fibers are aligned in a line.

6. The actuator according to claim 5, wherein
    the one or more first actuator fibers and the one or more second actuator fibers are disposed so as to be symmetrical with respect to an intermediate line between two actuator fibers located at ends of the line.

7. The actuator according to claim 1, wherein
    each of the one or more first actuator fibers has a first spring shape including a first coil diameter, a first spring pitch, and a first wire diameter that is a wire diameter of the high polymer fiber bundle of the one or more first actuator fibers;
    each of the one or more second actuator fibers has a second spring shape including a second coil diameter that is equal to the first coil diameter, a second spring pitch that is equal to the first spring pitch, and a second wire diameter that is a wire diameter of the high polymer fiber bundle of the one or more second actuator fibers and is equal to the first wire diameter; and the length of each of the one or more first actuator fibers and the length of each of the one or more second actuator fibers are different from each other.

8. The actuator according to claim 1, wherein the one or more second actuator fibers includes a plurality of actuator fibers having different spring rates; and the plurality of actuator fibers having the different spring rates are different from each other in terms of a displacement range in which tension acts.

9. The actuator according to claim 8, wherein the one or more second actuator fibers includes actuator fibers having different lengths.

10. The actuator according to claim 9, wherein one of conditions required to strain the one or more first actuator fibers and the one or more second actuator fibers to the same degree is that the displacement amount is equal to or larger than the first displacement amount and equal to or smaller than the maximum displacement amount.

11. The actuator according to claim 6, wherein the ends include a first end and a second end;

the one or more first actuator fibers and the one or more second actuator fibers are disposed in a first order from the intermediate line toward the first end and are disposed in the first order from the intermediate line toward the second end; and in the first order, reciprocals of the spring rates of the one or more first actuator fibers and the one or more second actuator fibers linearly increase or linearly decrease.

12. The actuator according to claim 6, wherein the ends include a first end and a second end;

the one or more first actuator fibers and the one or more second actuator fibers are disposed in a first order from the intermediate line toward the first end and are disposed in the first order from the intermediate line toward the second end; and in the first order, reciprocals of the spring rates of the one or more first actuator fibers and the one or more second actuator fibers exponentially increase or exponentially decrease.

13. The actuator according to claim 6, wherein the ends include a first end;

the one or more second actuator fibers located between the intermediate line and the first end and at the first end include at least n actuator fibers where n is an integer of 3 or larger, and a spring rate of an actuator fiber located between two actuator fibers included in any three actuator fibers included in the n actuator fibers is smaller than a largest one of spring rates of the three actuator fibers and is larger than a smallest one of the spring rates of the three actuator fibers.

14. The actuator according to claim 8, wherein the one or more first actuator fibers and the plurality of second actuator fibers having the different spring rates are aligned in a line, and reciprocals of the spring rates of the first actuator fibers and the plurality of second actuator fibers having the different spring rates linearly change, in at least part of the line, in one direction or another direction opposite to the one direction along the line.

15. The actuator according to claim 8, wherein the one or more first actuator fibers and the plurality of second actuator fibers having the different spring rates are aligned in a line, and reciprocals of the spring rates of the first actuator fibers and the plurality of second actuator fibers having the different spring rates exponentially change, in at least part of the line, in one direction or another direction opposite to the one direction along the line.

* * * * *